US012200321B2

(12) United States Patent
Aher et al.

(10) Patent No.: US 12,200,321 B2
(45) Date of Patent: Jan. 14, 2025

(54) SYSTEM AND METHOD FOR GENERATING A CUSTOM SUMMARY OF UNCONSUMED PORTIONS OF A SERIES OF MEDIA ASSETS

(71) Applicant: Adeia Guides Inc., San Jose, CA (US)

(72) Inventors: Ankur Anil Aher, Maharashtra (IN); Harish Ashok Kumar, Tamil Nadu (IN); Bhavna Jindal, Punjab (IN); Anjali Gulati, Punjab (IN)

(73) Assignee: Adeia Guides Inc., San Jose, CA (US)

( * ) Notice: Subject to any disclaimer, the term of this patent is extended or adjusted under 35 U.S.C. 154(b) by 85 days.

(21) Appl. No.: 17/145,043

(22) Filed: Jan. 8, 2021

(65) Prior Publication Data

US 2021/0160590 A1    May 27, 2021

Related U.S. Application Data

(63) Continuation of application No. 16/463,312, filed as application No. PCT/US2016/063849 on Nov. 28, 2016, now Pat. No. 10,917,703.

(51) Int. Cl.
| | |
|---|---|
| H04N 21/85 | (2011.01) |
| G11B 27/034 | (2006.01) |
| H04N 21/2387 | (2011.01) |
| H04N 21/482 | (2011.01) |
| H04N 21/845 | (2011.01) |
| H04N 21/8549 | (2011.01) |
| G06F 16/738 | (2019.01) |
| H04N 21/6587 | (2011.01) |

(52) U.S. Cl.
CPC ....... *H04N 21/8549* (2013.01); *G11B 27/034* (2013.01); *H04N 21/2387* (2013.01); *H04N 21/4825* (2013.01); *H04N 21/8456* (2013.01); *G06F 16/739* (2019.01); *H04N 21/6587* (2013.01)

(58) Field of Classification Search
USPC .................................................. 386/241, 248
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |

(Continued)

OTHER PUBLICATIONS

International Search Report and Written Opinion of PCT/US2016/063849 dated Feb. 20, 2017.

*Primary Examiner* — Nigar Chowdhury
(74) *Attorney, Agent, or Firm* — Haley Guiliano LLP

(57) ABSTRACT

Systems and methods are provided herein for generating summaries of unconsumed portions of an ordered series of media assets, customized for multiple users. A media guidance application may determine that a given media asset of an ordered series is to be collectively consumed by a first user and a second user. A first portion of an ordered series, that both the first user and the second user have not yet consumed, is identified together with a second portion of the ordered series that the first user has consumed but the second user has not yet consumed. A custom summary including a detailed summary of the first portion (e.g., a two minute summary) and less detailed summary of the second portion (e.g., a one minute summary) is generated.

20 Claims, 10 Drawing Sheets

(56) References Cited

U.S. PATENT DOCUMENTS

| | | | |
|---|---|---|---|
| 7,761,892 B2 | 7/2010 | Ellis et al. | |
| 8,046,801 B2 | 10/2011 | Ellis et al. | |
| 9,286,938 B1* | 3/2016 | Tseytlin | G11B 27/031 |
| 10,469,918 B1* | 11/2019 | Carlson | H04N 21/8549 |
| 10,595,087 B2* | 3/2020 | Minnick | H04N 21/466 |
| 2002/0174430 A1 | 11/2002 | Ellis et al. | |
| 2003/0212611 A1* | 11/2003 | Barrott | G06Q 50/188 |
| | | | 705/26.61 |
| 2004/0122730 A1* | 6/2004 | Tucciarone | H04L 12/1859 |
| | | | 705/14.66 |
| 2005/0251827 A1 | 11/2005 | Ellis et al. | |
| 2007/0101394 A1 | 5/2007 | Fu et al. | |
| 2009/0119704 A1 | 5/2009 | Dimitrova et al. | |
| 2010/0010921 A1* | 1/2010 | Liu | G06Q 30/08 |
| | | | 705/30 |
| 2010/0153885 A1 | 6/2010 | Yates | |
| 2010/0192187 A1* | 7/2010 | Toebes | H04N 21/44224 |
| | | | 725/87 |
| 2010/0277650 A1 | 11/2010 | Matsuzaki | |
| 2013/0156321 A1* | 6/2013 | Motoi | G06V 20/47 |
| | | | 382/190 |
| 2014/0075309 A1* | 3/2014 | Dingsor | G06F 16/435 |
| | | | 715/716 |
| 2014/0129256 A1* | 5/2014 | Veren | G06Q 10/10 |
| | | | 705/3 |
| 2015/0134673 A1* | 5/2015 | Golan | G06F 16/44 |
| | | | 707/748 |
| 2015/0334472 A1 | 11/2015 | Kishore | |
| 2015/0363481 A1* | 12/2015 | Haynes | G06Q 10/10 |
| | | | 707/748 |
| 2015/0365730 A1* | 12/2015 | Mohan | G11B 27/322 |
| | | | 725/21 |
| 2015/0366518 A1* | 12/2015 | Sampson | A61B 5/7264 |
| | | | 600/509 |
| 2016/0012182 A1* | 1/2016 | Golay | G16H 40/20 |
| | | | 705/3 |
| 2016/0019693 A1* | 1/2016 | Silbersweig | G06T 11/60 |
| | | | 382/128 |
| 2016/0173941 A1* | 6/2016 | Gilson | H04N 21/44226 |
| | | | 725/14 |
| 2017/0054982 A1* | 2/2017 | Vellore Arumugam | H04N 19/17 |
| 2017/0062005 A1* | 3/2017 | Kolesnikov | H04N 5/76 |
| 2017/0251258 A1* | 8/2017 | Swaminathan | H04N 21/4826 |
| 2017/0280208 A1* | 9/2017 | Mishra | G06F 18/29 |

* cited by examiner

100

SEGMENTS IN THE FIRST PORTION

| SEGMENT ID (104) | MEDIA ASSET TITLE (106) | PRIORITY (108) | DESCRIPTION (110) | |
|---|---|---|---|---|
| QS47 | GAME OF THRONES, EPISODE 7 | 4 | TYWIN GIVES HIS FORCES TO JAIME TO ATTACK RIVERRUN | 112 |
| WV90 | GAME OF THRONES, EPISODE 7 | 3 | JON SNOW TAKES HIS VOWS AT THE WALL | 114 |
| PS23 | GAME OF THRONES, EPISODE 7 | 7 | ATTEMPTED ASSASINATION OF DAENERYS TARGARYEN | 116 |
| YU54 | GAME OF THRONES, EPISODE 7 | 9 | LITTLEFINGER BETRAYS NED STARK | 118 |
| SJ34 | GAME OF THRONES, EPISODE 7 | 7 | DAENERYS TARGARYEN CONVINCES DROGO TO MARCH TO WESTEROS | 120 |

SEGMENTS IN THE SECOND PORTION 122

| SEGMENT ID (124) | MEDIA ASSET TITLE (126) | PRIORITY (128) | DESCRIPTION (130) | |
|---|---|---|---|---|
| XT23 | GAME OF THRONES, EPISODE 5 | 3 | CATELYN STARK KIDNAPS TYRION | 132 |
| AF34 | GAME OF THRONES, EPISODE 5 | 9 | NED STARK INVESTIGATES THE DEATH OF THE PREVIOUS HAND | 134 |
| GF34 | GAME OF THRONES, EPISODE 5 | 6 | ARYA OVERHEARS A PLOT TO MURDER NED STARK | 136 |
| XT26 | GAME OF THRONES, EPISODE 5 | 7 | ROBERT ORDERS ASSASINATION OF DAENERYS TARGARYEN | 138 |
| QG50 | GAME OF THRONES, EPISODE 5 | 7 | JAIME STABS NED STARK | 140 |
| XT23 | GAME OF THRONES, EPISODE 6 | 5 | TYRION ESCAPES | 142 |
| AF34 | GAME OF THRONES, EPISODE 6 | 6 | ROBERT GOES ON A HUNT, LEAVING NED STARK IN CHARGE | 144 |
| GF34 | GAME OF THRONES, EPISODE 6 | 10 | NED STARK CONCLUDES JOFFREY IS NOT ROBERT'S REAL SON | 146 |
| DT60 | GAME OF THRONES, EPISODE 6 | 7 | VISERYS TRIES TO STEAL DRAGON EGGS | 148 |
| QM40 | GAME OF THRONES, EPISODE 6 | 7 | DAENERYS TARGARYEN WATCHES VISERY'S EXECUTION | 150 |

SEGMENTS FOR CUSTOM SUMMARY 152

| SEGMENT ID (154) | MEDIA ASSET TITLE (156) | PRIORITY (158) | DESCRIPTION (160) | |
|---|---|---|---|---|
| AF34 | GAME OF THRONES, EPISODE 5 | 9 | NED STARK INVESTIGATES THE DEATH OF THE PREVIOUS HAND | 162 |
| GF34 | GAME OF THRONES, EPISODE 6 | 10 | NED STARK CONCLUDES JOFFREY IS NOT ROBERT'S REAL SON | 164 |
| PS23 | GAME OF THRONES, EPISODE 7 | 7 | ATTEMPTED ASSASINATION OF DAENERYS TARGARYEN | 166 |
| YU54 | GAME OF THRONES, EPISODE 7 | 9 | LITTLEFINGER BETRAYS NED STARK | 168 |
| SJ34 | GAME OF THRONES, EPISODE 7 | 7 | DAENERYS TARGARYEN CONVINCES DROGO TO MARCH TO WESTEROS | 170 |

902
IDENTIFY A FIRST USER AND A SECOND USER WHO WILL COLLECTIVELY BE CONSUMING A GIVEN MEDIA ASSET OF AN ORDERED SERIES OF MEDIA ASSETS

904
IDENTIFY A FIRST PORTION OF THE ORDERED SERIES THAT BOTH THE FIRST USER AND THE SECOND USER HAVE NOT CONSUMED, AND A SECOND PORTION OF THE ORDERED SERIES THAT THE FIRST USER HAS CONSUMED BUT THE SECOND USER HAS NOT YET CONSUMED, WHERE BOTH THE FIRST PORTION AND THE SECOND PORTION PERCEDE THE GIVEN MEDIA ASSET IN THE ORDERED SERIES

906
GENERATE A CUSTOM SUMMARY THAT INCLUDES A FIRST SUMMARY OF THE FIRST PORTION AND A SECOND SUMMARY OF THE SECOND PORTION, WHERE THE FIRST SUMMARY IS MORE DETAILED THAN THE SECOND SUMMARY.

FIG. 9

SYSTEM AND METHOD FOR GENERATING A CUSTOM SUMMARY OF UNCONSUMED PORTIONS OF A SERIES OF MEDIA ASSETS

CROSS-REFERENCE TO RELATED APPLICATIONS

This application is a continuation of U.S. patent application Ser. No. 16/463,312, filed on May 22, 2019, which is a national stage application under 35 U.S.C. § 371 of International Application PCT/US2016/063849, filed Nov. 28, 2016. The disclosures of each referenced application are hereby incorporated by reference herein in their entireties.

BACKGROUND

In currently available media systems, prior to playing an episode of an ordered series, a summary of preceding events in the ordered series is sometimes presented to a user. The summary is usually a pre-created video and/or audio asset that is automatically transmitted to a client device without taking into account any user specific information. Furthermore, the summary is typically generated based on all content preceding the episode. In some systems, different pre-created versions of the summary are available for consumption (e.g., video only, text only, combination of video and text). However, current systems do not generate summaries dynamically, adjusting for different number users and different parts of a series that the user(s) have watched. Thus, current systems are not suited for customizing summaries for multiple users.

SUMMARY

Therefore, systems and methods are disclosed herein for generating custom summaries of unconsumed episodes of an ordered series. A media guidance application may determine that a given media asset of an ordered series is to be collectively consumed by a first user and a second user. A first portion of an ordered series, that both the first user and the second user have not yet consumed, is identified together with a second portion of the ordered series that the first user has consumed but the second user has not yet consumed. A custom summary including a detailed summary of the first portion (e.g., a two-minute summary) and less detailed summary of the second portion (e.g., a one-minute summary) is generated.

In some aspects, a media guidance application may be configured to generate a custom summary of unconsumed portions of an ordered series. The custom summary may be suitable for multiple users that are collectively consuming a media asset of the ordered series. A media guidance application may determine that a first user and a second user will collectively be consuming a given media asset of an ordered series of media assets. For example, the media guidance application may determine that Jack and Mary are about to watch episode eight of the series "Game of Thrones" on the same user equipment. It should be noted that any systems and methods described here may be performed outside of a media guidance application.

In some embodiments, a user may be consuming a given media asset from different user equipment. Specifically, the media guidance application may detect that the given media asset is simultaneously being accessed by the first user via a first user equipment, and by the second user via a second user equipment. For example, the media guidance application may detect that Jack has requested to watch episode eight of the series "Game of Thrones" on a tablet at 7:58 pm. In some embodiments, the media guidance application may detect that episode eight of the series "Game of Thrones" is scheduled to start at 8:00 pm on a channel that a television associated with Mary is tuned to. The media guidance application may, in response to detecting that the given media asset is simultaneously being accessed by the first user and by the second user, determine, based on communication data between the first user and the second user, that the first user and the second user are interested in collectively consuming the given media asset. The media guidance application may, in response to determining that both the first user and the second user are interested in collectively consuming the given media asset, determine that the first user and the second user will collectively be consuming the given media asset. For example, the media guidance application may determine, based on text messages exchanged between Jack and Mary (e.g., "Let's watch episode eight of 'Game of Thrones' together?" and "Sure!"), that Jack and Mary are interested in collectively consuming episode eight of "Game of Thrones." Accordingly, the media guidance application may determine that Jack and Mary will collectively be consuming episode eight of "Game of Thrones."

The media guidance application may determine a portion of the ordered series that has not been consumed by the first user and a portion of the ordered series that has not been consumed by the second user. Specifically, the media guidance application may retrieve first media consumption history data associated with the first user and second media consumption history data associated with the second user. For example, the media guidance application may retrieve a list of media assets watched by Jack from a user profile associated with Jack and a list of media assets watched by Mary from a user profile associated with Mary.

The media guidance application may determine, based on the first media consumption history data, a first plurality of media assets in the ordered series that the first user has consumed. For example, the media guidance application may determine, based on the list of media assets watched by Jack, that Jack has watched episodes two through six of the series "Game of Thrones." The media guidance application may compare the first plurality of media assets with a complete list of media assets in the ordered series. As referred to herein, a complete list of media assets in an ordered series refers to a list that includes all media assets in the ordered series or a list that includes a specific portion of all media assets in the ordered series. For example, for an ordered series that includes two seasons with ten episodes each, a complete list of media assets in the ordered series may be a list of all twenty episodes or a list of the ten episodes included in season one or season two. The media guidance application may determine, based on comparing the first plurality of media assets with the complete list of media assets in the ordered series, a first set of media assets in the ordered series that the first user has not yet consumed, where each media asset in the first set has a respective position in the ordered series that precedes a position of the given media asset in the ordered series. For example, the media guidance application may retrieve a complete episode list that indicates that the series "Game of Thrones" includes episodes one through ten. The media guidance application may determine, based on the complete episode list, a list of all media assets in the ordered series that precede the given media asset. For example, the media guidance may determine that episodes one through seven precede episode eight. The media guidance application may compare the media assets in the list of media assets watched by Jack with the media assets in the list of all episodes of the series "Game of Thrones" that precede episode eight and determine that Jack has not watched episodes one and seven of "Game of Thrones." It should be noted that a media asset preceding a given media asset may be one that has a later release date than the given media asset.

The media guidance application may determine the portion of the ordered series that has not been consumed by the second user in a manner similar to determining the portion of the ordered series that has not been consumed by the first user. The media guidance application may determine, based on the second media consumption history data, a second plurality of media assets in the ordered series that the second user has consumed. For example, the media guidance application may determine that Mary has watched episodes one through four of the series "Game of Thrones." The media guidance application may compare the second plurality of media assets with the complete list of media assets in the ordered series. The media guidance application may determine, based on comparing the second plurality of media assets with the complete list of media assets in the ordered series, a second set of media assets in the ordered series that the second user has not yet consumed, where each media asset in the second set has a respective position in the ordered series that precedes the position of the given media asset in the ordered series. For example, the media guidance application may determine, based on comparing the list of media assets watched by Mary and the list of all episodes of the series "Game of Thrones" that precede episode eight, that Mary has not watched episodes five through seven of "Game of Thrones."

The media guidance application may determine a portion of the ordered series that has not been consumed by all users and another portion of the ordered series that has been consumed by one user but not yet been consumed by another user. The media guidance application may compare media assets in the first set with media assets in the second set. The media guidance application may determine, based on comparing the media assets in the first set with the media assets in the second set, a first portion of media assets in the ordered series that both the first user and the second user have not yet consumed, and a second portion of media assets in the ordered series that the first user has consumed but the second user has not yet consumed. For example, the media guidance application may identify episode seven of "Game of Thrones" as the first portion that both Jack and Mary have not yet watched and episodes five and six of "Game of Thrones" as the second portion that Jack has watched but Mary has not yet watched.

In some embodiments, the media guidance application may, when determining the first portion of media assets and the second portion of media assets in the ordered series, determine whether a media asset in the second set of media assets is included in the first set of media assets. The media guidance application may, in response to determining that the media asset in the second set of media assets is included in the first set of media assets, include the media asset in the first portion of media assets. The media guidance application may, in response to determining that the media asset of the second set of media assets is not included in the first set of media assets, include the media asset in the second portion. For example, the media guidance application may determine that a list of media assets preceding episode eight in "Game of Thrones" that Mary has not yet watched (i.e., the second set) includes episodes five through seven. The media guidance application may access a list of media assets preceding episode eight in "Game of Thrones" that Jack has not yet watched (i.e., the first set) for episodes five, six, and seven. Upon determining that the list of media assets preceding episode eight in "Game of Thrones" that Jack has not yet watched includes episode seven but does not include episodes five and six, the media guidance application may include episode seven in the first portion and episodes five and six in the second portion.

The media guidance application may retrieve a first criterion for selecting important segments of the portion that has not been consumed by both users for inclusion in a custom summary. The media guidance application may retrieve a different second criterion for selecting important segments of the portion of the ordered series that has been consumed by one user but not yet been consumed by another user for inclusion in the custom summary. Specifically, the media guidance application may retrieve a first criterion for determining whether to include, in a custom summary, a segment of a media asset that is associated with the first portion of media assets, and a second criterion for determining whether to include, in the custom summary, a segment of a media asset associated with the second portion of media assets, where the first criterion is less restrictive than the second criterion. For example, the first criterion may include a minimum threshold priority value for including a segment of the first portion in the custom summary. The second criterion may include a minimum threshold priority value for including a segment of the second portion in the custom summary. For example, the media guidance application may retrieve a threshold priority value of six for episode seven of "Game of Thrones" and threshold priority value of eight for episodes five and six of "Game of Thrones."

The media guidance application may select important segments of the portion that has not been consumed by both users based on the first criterion. The media guidance application may compare each priority value that is associated with a respective segment of a media asset in the first portion of media assets with the first criterion. The media guidance application may determine, based on comparing each priority value that is associated with the respective segment of each media asset in the first portion of media assets with the first criterion, a first plurality of segments of media assets that are included the first portion of media assets, where each segment in the first plurality of segments is associated with a priority value that matches the first criterion. For example, the media guidance application may query a database for segments of episode seven of "Game of Thrones" that have priority values higher than six. In some embodiments, the media guidance application may use metadata extraction tools to identify, from metadata associated with episode seven of "Game of Thrones," segments of episode seven of "Game of Thrones" that have priority values higher than six.

The media guidance application may select important segments of the portion that has not yet been consumed by one of the two users based on the second criterion. The media guidance application may compare each priority value that is associated with a respective segment of a media asset in the second portion of media assets with the second criterion. The media guidance application may determine, based on comparing each priority value that is associated with a respective segment of a media asset in the second portion of media assets with the second criterion, a second plurality of segments of media assets that are included in the second portion of media assets, where each segment in the second plurality of segments is associated with a priority value that matches the second criterion. The media guidance application may determine, in a manner similar to determining the first plurality of segments, segments of episodes five and six of "Game of Thrones" that have priority values higher than eight.

In some embodiments, the media guidance application may determine the first criterion and the second criterion based on users' level of interest in the ordered series. Specifically, the media guidance application may determine, based on the first media consumption history data associated with the first user, a first level of interest of the first user in the ordered series. The media guidance application may determine, based on the second media consumption history data associated with the second user, a second level of interest of the second user in the ordered series. The media guidance application may determine the first criterion based on the first level of interest and the second criterion based on the second level of interest.

As an illustrative example, the media guidance application may retrieve, from user behavior data associated with Jack's user profile, an amount of "Game of Thrones" that Jack has fast-forwarded through. For example, the media guidance application may determine that Jack has fast-forwarded through ten percent of "Game of Thrones." The media guidance application may execute an appropriate routine to determine the level of interest in "Game of Thrones" that fast-forwarding through ten percent of "Game of Thrones" corresponds to. For example, the media guidance application may access a look-up table to determine that, on a level of interest scale ranging from one to ten with ten corresponding to the highest level of interest, fast-forwarding through ten percent of "Game of Thrones" corresponds to a level of interest of nine. The media guidance application may similarly determine, based on user behavior data associated with Mary's user profile, that Mary's level of interest in "Game of Thrones" is four. The media guidance application may determine the first criterion (e.g., minimum threshold priority value for including a segment of the first portion in the custom summary) based on Jack's level of interest (e.g., nine). The media guidance application may determine the second criterion (e.g., minimum threshold priority value for including a segment of the second portion in the custom summary) based on Mary's level of interest (e.g., four).

In some embodiments, the media guidance application may, when determining the first criterion based on the first level of interest, retrieve a default value associated with the first criterion. The media guidance application may modify the default value based on the first level of interest. As an illustrative example, the media guidance application may retrieve a default minimum threshold priority value associated with the first criterion (e.g., six). The media guidance application may execute a routine that modifies the default threshold priority value based on Jack's level of interest (e.g., nine). For example, the media guidance application may modify the threshold priority value to be 6.4.

In some embodiments, the media guidance application may update the important segments of the portion that has not been consumed by both users to be included in the custom summary by removing segments that are not associated with a characteristic that is of interest to at least one of the users. The media guidance application may determine, based on the first media consumption history data associated with the first user, a first characteristic that is of interest to the first user, where the first characteristic is associated with the ordered series. For example, the media guidance application may determine, based on user preferences data associated with Jack's user profile, that a characteristic of "Game of Thrones" that is of interest to Jack is the character "Daenerys Targaryen." The media guidance application may determine, based on the second media consumption history data associated with the second user, a second characteristic that is of interest to the second user, where the second characteristic is associated with the ordered series. For example, the media guidance application may determine, based on user preferences data associated with Mary's user profile, that a characteristic of "Game of Thrones" that is of interest to Mary is the character "Joffrey Baratheon."

The media guidance application may determine a first set of segments of the first plurality of segments that is associated with at least one of the first characteristic and the second characteristic. The media guidance application may update the first plurality to remove segments that are not included in the first set of segments. For example, the media guidance application may determine segments of the first plurality of segments that are associated with at least one of the characters "Joffrey Baratheon" and "Daenerys Targaryen." The media guidance application may update the first plurality by removing all segments that are not associated with at least one of the characters "Joffrey Baratheon" and "Daenerys Targaryen." For example, the media guidance application may remove a segment in the first plurality that is associated with the characters "Ned Stark" and "Littlefinger."

In some embodiments, the media guidance application may update the important segments to be included in the custom summary, corresponding to the portion that has been consumed by one user but not yet been consumed by another user, by removing segments that are not associated with a characteristic that is of interest to the user who has not yet consumed the portion. Specifically, the media guidance application may determine a second set of segments of the second plurality of segments that is associated with the second characteristic. The media guidance application may update the second plurality to remove segments that are not included in the second set of segments. For the case that a characteristic of "Game of Thrones" that is of interest to Mary is the character "Joffrey Baratheon," the media guidance application may update the second plurality by removing all segments that are not associated with the character "Joffrey Baratheon."

The media guidance application may generate the custom summary that includes the first plurality of segments and the second plurality of segments. For example, the media guidance application may generate a custom summary of episodes five through seven of "Game of Thrones" that includes segments of episodes five and six of "Game of Thrones" that have priority values greater than eight and segments of episode seven of "Game of Thrones" that have priority values greater than six.

In some embodiments, the media guidance application may modify a generated custom summary such that the duration of the modified custom summary fulfills a maximum duration parameter. The media guidance application may retrieve a maximum length of the custom summary, where the maximum length corresponds to a maximum duration of the custom summary. For example, the media guidance application may retrieve a value of five minutes corresponding to the maximum length of the custom summary. In some embodiments, the media guidance application may compute the maximum length based on a duration of the given media asset. Specifically, the media guidance application may determine a duration of the given media asset and compute the maximum length of the custom summary based on a pre-defined fraction of the duration of the given media asset. For example, the media guidance application may determine, based on parameters for displaying custom summaries, that the maximum length of a custom summary is one-tenth of a duration of a given media asset. The media guidance application may determine that episode eight of "Game of Thrones" is sixty minutes long and, accordingly the media guidance application may compute the maximum length to be six minutes.

The media guidance application may determine a first length corresponding to a total duration of the first plurality of segments and a second length corresponding to a total duration of the second plurality of segments. The media guidance application may compute a new first length and a new second length, where the new first length and the new second length combined equal to the maximum length, and where a ratio of the new first length to the new second length is equal to a ratio of the first length to the second length. For example, the media guidance application may determine that the first length of segments corresponding to episode seven of "Game of Thrones" is six minutes and the second length of segments corresponding to episodes five and six of "Game of Thrones" is four minutes. For the case where the maximum length is five minutes, the media guidance application may compute the new first length to be three minutes and the new second length to be two minutes.

The media guidance application may select a combination of segments for inclusion in the custom summary such that the total duration of the combination is closest to the maximum length. Specifically, the media guidance application may determine a first combination of segments of media assets in the first plurality of segments, where a difference between a total duration of the first combination of segments and the new first length is less than a difference between a total duration of any other combination of segments of the first plurality of segments and the new first length. The media guidance application may determine a second combination of segments of media assets in the first plurality of segments, where a difference between a total duration of the second combination of segments and the new second length is less than a difference between a total duration of any other combination of segments of the second plurality of segments and the new second length. The media guidance application may update the custom summary by removing segments not included in the first combination of segments, and by removing segments not included in the second combination of segments.

As an illustrative example, the media guidance application may determine that the first plurality of segments corresponding to episode seven of "Game of Thrones" includes three segments: segment A with a duration of one minute, segment B with a duration of two minutes, and segment C with a duration of three minutes. The media guidance application may determine that the possible combinations are segments A & B with a total duration of three minutes, segments A & C with a total duration of four minutes, segments B & C with a total duration of five minutes, and segments A & B & C with a total duration of six minutes. The media guidance application may determine that difference between the total duration of segments A & B and the first length (e.g., zero minutes) is the minimum difference and update the custom summary by removing segment C.

As an illustrative example, the media guidance application may determine that the second plurality of segments corresponding to episodes five and six of "Game of Thrones" includes two segments: segment X with a duration of one and half minutes and segment Y with a duration of two and half minutes. The media guidance application may determine that the possible combinations are segment X, segment Y, and segments X & Y. In this case, the media guidance application may determine that segment X is the only possible combination which has a duration that does not exceed the second length. Accordingly, the media guidance application may update the custom summary by removing segment Y.

In some embodiments, the media guidance application may include in the custom summary a portion of the ordered series that has been consumed by the second user and not yet been consumed by the first user. The media guidance application may determine, based on comparing the media assets in the first set with the media assets in the second set, a third portion of media assets in the ordered series that the first user has not yet consumed but the second user has consumed. For example, the media guidance application may determine that a list of media assets preceding episode eight in "Game of Thrones" that Jack has not yet watched includes episodes one and seven. The media guidance application may determine that a list of media assets preceding episode eight in "Game of Thrones" that Mary has not yet watched includes episodes five through seven. The media guidance application may identify, based on comparing the two lists, episode one of "Game of Thrones" as the third portion that Jack has not yet consumed but Mary has consumed.

The media guidance application may retrieve a third criterion for determining whether to include, in the custom summary, a segment of a media asset that is associated with the third portion of media assets, where the first criterion is less restrictive than the third criterion. For example, the third criterion may include a minimum threshold priority value for including a segment of the third portion in the custom summary. For example, the first criterion may be threshold priority value of six corresponding to episode seven of "Game of Thrones." The media guidance application may retrieve a threshold priority value of seven for episode one of "Game of Thrones."

The media guidance application may compare each priority value that is associated with a respective segment of a media asset in the third portion of media assets with the third criterion. The media guidance application may determine, based on comparing each priority value that is associated with the respective segment of each media asset in the third portion of media assets with the third criterion, a third plurality of segments of media assets that are included in the third portion of media assets, where each segment in the third plurality of segments is associated with a priority value that matches the third criterion. The media guidance application may include the third plurality of segments in the custom summary. The media guidance application may determine, in a manner similar to determining the first plurality of segments and the second plurality of segments, segments of episode one of "Game of Thrones" that have priority values higher than seven and include these segments in the custom summary.

It should be noted that the systems, methods, apparatuses, and/or aspects described above may be applied to, or used in accordance with, other systems, methods, apparatuses, and/or aspects described in this disclosure. It should also be noted that the systems and/or methods described above may be applied to, or used in accordance with, other systems and/or methods.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 depicts three data structures that the media guidance application may generate when generating a custom summary, in accordance with some embodiments of the disclosure;

FIG. 9 is flowchart of illustrative steps involved in generating a custom summary based on a first user's and a second user's progress through an ordered series, in accordance with some embodiments of the disclosure.

DETAILED DESCRIPTION

Figure 2:
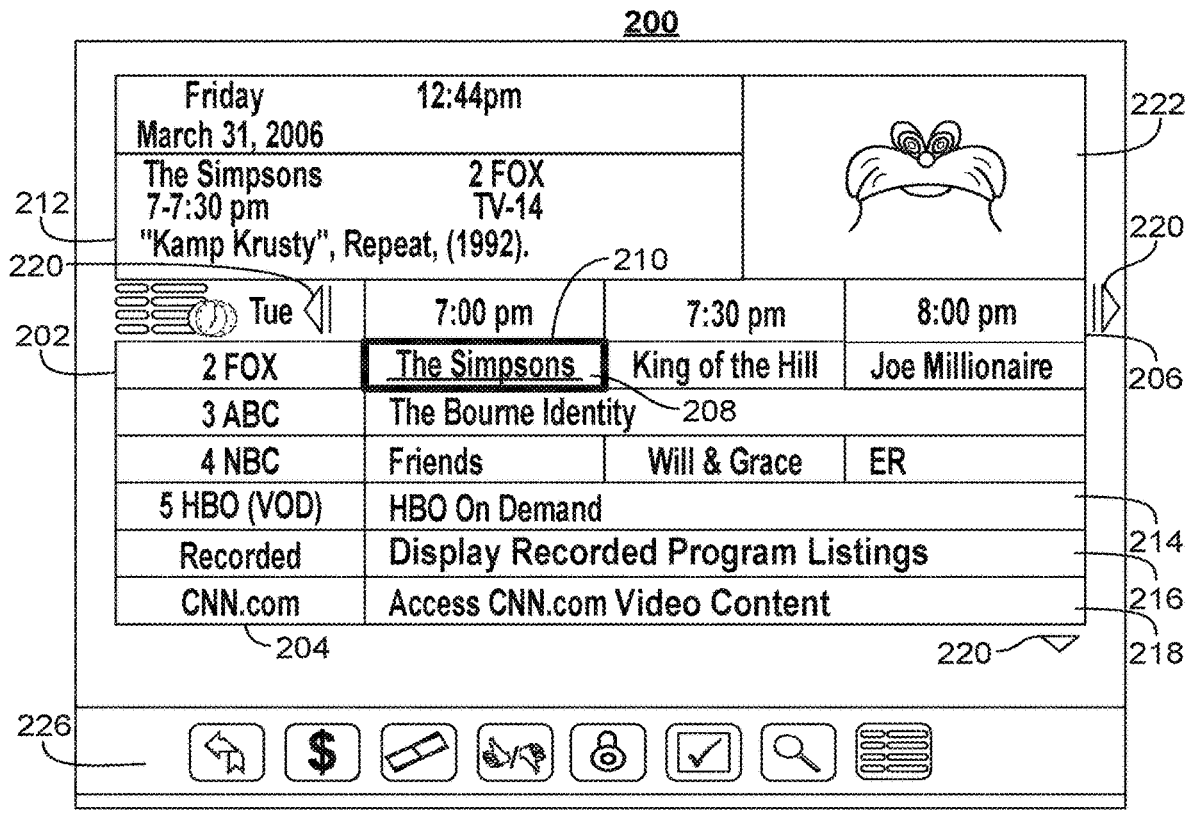
FIG. 2 shows an illustrative embodiment of a display screen that may be used to provide media guidance application listings and other media guidance information, in accordance with some embodiments of the disclosure.

The described systems and methods generate summaries of unconsumed portions of an ordered series that are customized for multiple users. A media guidance application may determine that a given media asset of an ordered series is to be collectively consumed by a first user and a second user. The media guidance application may determine a first portion of an ordered series that both the first user and the second user have not yet consumed together with a second portion of the ordered series that the first user has consumed but the second user has not yet consumed. The media guidance application may generate a custom summary that includes a detailed summary of the first portion (e.g., a two-minute summary) and a less detailed summary of the second portion (e.g., a one-minute summary).

The media guidance application may reside on user television equipment 502, user computer equipment 504, and/or wireless user communications device 506. In some embodiments, some or all portions of the media guidance application may be located at media content source 516 and/or media guidance data source 518. In some embodiments, portions of the media guidance application may be located on each of user television equipment 502, user computer equipment 504, wireless user communications device 506, media content source 516, and media guidance data source 518.

In some embodiments, the media guidance application may be configured to generate a custom summary of unconsumed portions of an ordered series. The custom summary may be suitable for multiple users that are collectively consuming a media asset of the ordered series. A media guidance application may determine that a first user and a second user will collectively be consuming a given media asset of an ordered series of media assets. For example, the media guidance application may determine that Jack and Mary are about to watch episode eight of the series "Game of Thrones" on the same user equipment (e.g., user television equipment 502, user computer equipment 504, and wireless user communications device 506). "Game of Thrones" is a fantasy drama television series set in multiple fictional continents that involves several plot lines and a large cast.

In some embodiments, the media guidance application may receive an input, via user input interface 410, from at least one of the first user and second user indicating that the first user and the second user will collectively be consuming the given media asset (e.g., user may input identifiers of users who will collectively be consuming the given media asset). Additionally or alternatively, the media guidance application may, upon receiving a request for a given media asset or upon determining that a given media asset is scheduled to start on a channel currently tuned to, access data associated with sensor devices (e.g., image capture devices, motion sensors, wireless signal detectors, and other suitable sensor devices) to determine the number and/or identity of the users accessing a given media asset via a user equipment. The media guidance application may identify the first user and the second user based on a unique identifier, such as a string of characters or bio-metric data (e.g., finger print, retina scan, voice recognition, or another suitable bio-metric data), associated with each of the first user and the second user. In some embodiments, the media guidance application may determine unique identifiers associated with the first user and the second user based on data associated with sensor devices. For example, the media guidance application may use facial recognition techniques on an image captured by a camera to determine the identity of the users.

In some embodiments, the media guidance application may determine that two users who are simultaneously accessing the given media asset via two separate user equipments will collectively be consuming the given media asset based on a communication between the two users. Specifically, the media guidance application may detect that the given media asset is simultaneously being accessed by the first user via a first user equipment, and by the second user via a second user equipment. For example, the media guidance application may detect that Jack has requested to watch episode eight of the series "Game of Thrones" on a tablet at 7:58 pm. The media guidance application may detect that episode eight of the series "Game of Thrones" is scheduled to start at 8:00 pm on a channel that a television associated with Mary is tuned to.

The media guidance application may, in response to detecting that the given media asset is simultaneously being accessed by the first user and by the second user, determine, based on communication data between the first user and the second user, that the first user and the second user are interested in collectively consuming the given media asset. The communication data may include a string of characters (e.g., text message, e-mail), an image (e.g., a meme), a video, an audio (e.g., a voicemail), and any combination thereof. The media guidance application may analyze a communication between the first user and the second user using an appropriate technique (e.g., natural language processing) to determine whether the communication indicates that the first user and the second user are interested in collectively consuming the given media asset. The media guidance application may, in response to determining that both the first user and the second user are interested in collectively consuming the given media asset, determine that the first user and the second user will collectively be consuming the given media asset. For example, a portion of the media guidance application may reside on user devices used to communicate by the two users. The media guidance application may determine by analyzing a text message from the first user that the first user is inviting the second user to watch a movie together, but from different locations (e.g., their own homes). The media guidance application may analyze a text message that is sent by the second user to determine whether the second user agrees.

The media guidance application may determine a portion of the ordered series that has not been consumed by the first user and a portion of the ordered series that has not been consumed by the second user. Specifically, the media guidance application may retrieve first media consumption history data associated with the first user and second media consumption history data associated with the second user. For example, the media guidance application may access a data structure associated with Jack's user profile for a list of media assets watched by Jack. The media guidance application may access a data structure associated with Mary's user profile for a list of media assets watched by Mary. The data structure associated with Jack's user profile and the data structure associated with Mary's user profile may be stored locally (e.g., in storage 408) and/or at a remote location (e.g., media content source 516 and/or media guidance data source 518 accessible via communications network 514). The media guidance application may retrieve portions of Jack's user profile from Jack's user equipment and a portion of Mary's profile from Mary's user equipment. In some embodiments, the media guidance application may retrieve portions of a user profile from a remote server (e.g., media content source 516 and/or media guidance data source 518 accessible via communications network 514) in order to get a complete profile.

The media guidance application may determine, based on the first media consumption history data, a first plurality of media assets in the ordered series that the first user has consumed. For example, the media guidance application may determine, based on the list of media assets watched by Jack, that Jack has watched episodes two through six of the series "Game of Thrones." The media guidance application may perform this determination by accessing the list of media assets watched by Jack for media assets associated with the series "Game of Thrones." The media guidance application may compare the first plurality of media assets with a complete list of media assets in the ordered series. The media guidance application may determine, based on comparing the first plurality of media assets with the complete list of media assets in the ordered series, a first set of media assets in the ordered series that the first user has not yet consumed, where each media asset in the first set has a respective position in the ordered series that precedes a position of the given media asset in the ordered series. A position of a media asset in an ordered series may be based on an episode number associated with the media asset, a combination of a season number and episode number associate with the media asset, or a release date associated with the media asset.

As an illustrative example, the media guidance application may query (e.g., by using database management languages such as SQL, JAPQL, CODASYL, or another suitable language) a content provider database for a complete episode list for the series "Game of Thrones." The media guidance application may determine, based on the complete episode list, that the series "Game of Thrones" includes episodes one through ten. The media guidance application may retrieve the complete episode list from any of storage 408, media content source 516, and media guidance data source 518. The media guidance application may determine, based on the complete episode list, a list of all media assets in the ordered series that precede the given media asset. For example, the media guidance application may extract position information associated with a media asset included in the complete episode list from metadata associated with the series. The media asset may then compare the position of the media asset with the position of the given media asset to determine whether the media asset precedes the given media asset in the ordered series. The media guidance application may determine that episodes one through seven precede episode eight. The media guidance application may compare the media assets in the list of media assets watched by Jack with the media assets in the list of all episodes of the series "Game of Thrones" that precede episode eight and determine that Jack has not watched episodes one and seven of "Game of Thrones."

The media guidance application may determine the portion of the ordered series that has not been consumed by the second user in a manner similar to determining the portion of the ordered series that has not been consumed by the first user. The media guidance application may determine, based on the second media consumption history data, a second plurality of media assets in the ordered series that the second user has consumed. For example, the media guidance application may determine that Mary has watched episodes one through four of the series "Game of Thrones." The media guidance application may compare the second plurality of media assets with the complete list of media assets in the ordered series. The media guidance application may determine, based on comparing the second plurality of media assets with the complete list of media assets in the ordered series, a second set of media assets in the ordered series that the second user has not yet consumed, where each media asset in the second set has a respective position in the ordered series that precedes the position of the given media asset in the ordered series. For example, the media guidance application may determine, based on accessing the list of media assets watched by Mary for media assets included in the list of all episodes of the series "Game of Thrones" that precede episode eight, that Mary has not watched episodes five through seven of "Game of Thrones."

The media guidance application may determine a portion of the ordered series that has not been consumed by both users and a portion of the ordered series that has been consumed by one user but not yet been consumed by another user. The media guidance application may compare media assets in the first set with media assets in the second set. The media guidance application may determine, based on comparing the media assets in the first set with the media assets in the second set, a first portion of media assets in the ordered series that both the first user and the second user have not yet consumed, and a second portion of media assets in the ordered series that the first user has consumed but the second user has not yet consumed. For example, the media guidance application may identify episode seven of "Game of Thrones" as the first portion that both Jack and Mary have not yet watched and episodes five and six of "Game of Thrones" as the second portion that Jack has watched but Mary has not yet watched. In some embodiments, the media guidance application may generate a data structure containing information about media assets in the first portion and another data structure containing information about media assets in the second portion. In some embodiments, the media guidance application may generate a single data structure containing information about media assets in both the first portion and the second portion.

FIG. 1 depicts three data structures that the media guidance application may generate when generating a custom summary, in accordance with some embodiments of the disclosure. As referred to herein, the term "custom summary" refers to a condensed recapitulation of important portions of content that is customized for multiple users. Although the depicted data structures may be used for storing information about segments of media assets, they are only an illustrative embodiment. Information about segments of media assets may be stored and categorized using other suitable data storage structures (e.g., linked lists, arrays) without departing from the scope of this invention.

The media guidance application may generate data structure 100 for segments of media assets in the first portion, data structure 122 for segments of media assets in the second portion, and data structure 152 for segments of media assets in the custom summary. Data structure 100 may include one or more entries associated with segments of media assets in the first portion. As an illustrative example, the data structure 100 may include entries 112, 114, 116, 118, and 120. Each entry in data structure 100 may include several fields that provide descriptive information about the segment associated with the entry. Exemplary fields include, but are not limited to, segment ID 104, media asset title 106, priority 108, and description 110. As an illustrative example, data structure 100 may include information about segments in episode seven of "Game of Thrones."

Data structure 122 may include one or more entries associated with segments of media assets in the second portion. As an illustrative example, data structure 122 may include entries 132, 134, 136, 138, 140, 142, 146, 148, and 150. Each entry in data structure 122 may constitute several fields that provide descriptive information about the segment associated with the entry. Exemplary fields include, but are not limited to, segment ID 124, media asset title 126, priority 128, and description 130. Data structure 152 may include one or more entries associated with segments of media assets in the custom summary. As an illustrative example, data structure 152 may include entries 162, 164, 166, 168, and 170. Each entry in data structure 152 may constitute several fields that provide descriptive information about the segment associated with the entry. Exemplary fields include, but are not limited to, segment ID 154, media asset title 156, priority 158, and description 160. As an illustrative example, data structure 122 may include information about segments in episodes five and six of "Game of Thrones."

Segment ID 104, 124 and 154 may be a unique or specific identifier associated with a segment or a pointer or link to the segment itself. In some embodiments, in order to populate the different fields of an entry associated with a segment, the media guidance application may retrieve relevant information associated with the segment from metadata associated with the segment. As an illustrative example, entry 112 may correspond to segment QS47. The media guidance application may retrieve media asset title 106, priority 108, and description 110 from metadata associated with segment QS47. The metadata associated with segment QS47 may be located at any of storage 408, media content source 516, and media guidance data source 518.

In some embodiments, the media guidance application may, when determining the first portion of media assets and the second portion of media assets in the ordered series, determine whether a media asset in the second set of media assets is included in the first set of media assets. The media guidance application may, in response to determining that the media asset in the second set of media assets is included in the first set of media assets, include the media asset in the first portion of media assets. The media guidance application may, in response to determining that the media asset of the second set of media assets is not included in the first set of media assets, include the media asset in the second portion. The media guidance application may access the list of media assets watched by Mary for each media asset included in the list of all episodes of the series "Game of Thrones" that precede episode eight to determine media assets that are not included in the list of media assets watched by Mary (e.g., media assets associated with a result of "False"). The media guidance application may include the media assets that are not included in the list of media assets watched by Mary in a list of media assets preceding episode eight in "Game of Thrones" that Mary has not yet watched (i.e., the second set). For example, the media guidance application may determine that the second set includes episodes five through seven. The media guidance application may determine, by performing actions that are similar to determining the second set, that a list of media assets preceding episode eight in "Game of Thrones" that Jack has not yet watched (i.e., the first set) includes episodes one and seven.

The media guidance application may access the first set of media assets for each media asset included in the second set of media assets. In response to determining that a media asset of the second set is included in the first set (e.g., upon receiving a "True" result), the media guidance application may include the media asset in the first portion (e.g., the media guidance application may generate an entry associated with the media asset in a data structure storing information about the first portion). In response to determining that a media asset of the second set is not included in the first set (e.g., upon receiving a "False" result), the media guidance application may include the media asset in the second portion (e.g., the media guidance application may generate an entry associated with the media asset in a data structure storing information about the first portion). As an illustrative example, upon determining that the list of media assets preceding episode eight in "Game of Thrones" that Jack has not yet watched includes episode seven but does not include episodes five and six, the media guidance application may include episode seven in the first portion (e.g., as entries 112, 114, 116, 118, and 120 in data structure 100) and episodes five and six in the second portion (e.g., as entries 132, 134, 136, 138, 140, 142, 146, 148, and 150 in data structure 122).

The media guidance application may retrieve a first criterion for selecting important segments of the portion of the ordered series that has not been consumed by both users for inclusion in a custom summary. The media guidance application may retrieve a different second criterion for selecting important segments of the portion of the ordered series that has been consumed by one user but not yet been consumed by another user for inclusion in the custom summary. Specifically, the media guidance application may retrieve a first criterion for determining whether to include, in a custom summary, a segment of a media asset that is associated with the first portion of media assets, and a second criterion for determining whether to include, in the custom summary, a segment of a media asset associated with the second portion of media assets, where the first criterion is less restrictive than the second criterion.

A criterion may include any suitable parameter (e.g., priority value, genre of segment, popularity of a segment with a sample audience, characters associated with a segment, and other suitable parameters) for determining whether to include a given segment in the custom summary. For example, the first criterion may include a minimum threshold priority value for including a segment of the first portion in the custom summary. The second criterion may include a minimum threshold priority value for including a segment of the second portion in the custom summary. For example, the media guidance application may retrieve (e.g., by accessing a custom summary parameters data structure) a threshold priority value of six for episode seven of "Game of Thrones" and threshold priority value of eight for episodes five and six of "Game of Thrones." The first criterion and the second criterion may be provided by a content provider (e.g., television channel HBO). The media guidance application may retrieve the first criterion and the second criterion from any of storage 408, media content source 516, and media Guidance data source 518.

The media guidance application may select important segments of the portion of the ordered series that has not been consumed by both users based on the first criterion. As referred to herein, the term "segment" refers to a portion of a media asset that confers information about one or more aspects of the media asset. A segment may be a scene, a subplot, a portion of a media asset corresponding to a certain time interval in the media asset stream, or another suitable portion. The media guidance application may access a data structure, located remotely at any of media content source 516 and media guidance source 518, to determine segments associated with the portion of the ordered series that has not been consumed by both users (e.g., data structure 100). In some embodiments, the media guidance application may access metadata associated with the first portion to determine segments associated with the first portion (e.g., the media guidance application may determine, from metadata, that portion of episode seven encompassed by time stamps (00:00:01) and (00:01:00) is a segment of the first portion). The media guidance application may perform the determination of segments associated with the first portion based on metadata either locally at user equipment or remotely at a server. The media guidance application may receive segments associated with the ordered series from a remote server and select, locally at a user equipment, the appropriate segments to assemble the first plurality of segments. In some embodiments, the media guidance application may receive pre-assembled first plurality of segments from a remote server.

The media guidance application may compare each priority value that is associated with a respective segment of a media asset in the first portion of media assets with the first criterion. The media guidance application may determine, based on comparing each priority value that is associated with the respective segment of each media asset in the first portion of media assets with the first criterion, a first plurality of segments of media assets that are included in the first portion of media assets, where each segment in the first plurality of segments is associated with a priority value that matches the first criterion. For example, the media guidance application may access data structure 100 for entries associated with priority values higher than six. As an illustrative example, the media guidance application may include entries 116, 118 and 120, which are associated with priority values seven, nine and seven respectively, in the first plurality of segments.

The media guidance application may select important segments of the portion of the ordered series that has been consumed by one user but has not yet been consumed by another user based on the second criterion. The media guidance application may compare each priority value that is associated with a respective segment of a media asset in the second portion of media assets with the second criterion. The media guidance application may determine, based on comparing each priority value that is associated with a respective segment of a media asset in the second portion of media assets with the second criterion, a second plurality of segments of media assets that are included in the second portion of media assets, where each segment in the second plurality of segments is associated with a priority value that matches the second criterion. As an illustrative example, the media guidance application may retrieve from data structure 122 entries that are associated with priority values higher than eight and include, in the second plurality of segments, entries 134 and 146, which are associated with priority values nine and ten, respectively.

In some embodiments, the media guidance application may determine the first criterion and the second criterion based on users' level of interest in the ordered series. Specifically, the media guidance application may determine, based on the first media consumption history data associated with the first user, a first level of interest of the first user in the ordered series. The media guidance application may determine, based on the second media consumption history data associated with the second user, a second level of interest of the second user in the ordered series. The media guidance application may determine the first criterion based on the first level of interest and the second criterion based on the second level of interest.

As referred to herein, the term "level of interest" refers to a qualitative or quantitative indicator of appeal of a piece of content to a user. For example, the level of interest may be fuzzy logic variables such as "highly not interested," "moderately interested" and "highly interested." The level of interest may be a numerical value (e.g., five) on a predefined scale (e.g., scale ranging from zero to ten where zero corresponds to minimum interest and ten corresponds to maximum interest).

In some embodiments, the media guidance application may monitor for indicators of interest to determine the level of interest that the user has with respect to a media asset. Indicators of interest in a given content can be, but are not limited to, a user's media consumption preferences (e.g., genre, characters, media format and other suitable preferences), representation of actions performed on various content (e.g., volume changes, playback speed changes, channel switch and other suitable actions), user's activity during presentation of various content (e.g., viewer's social media activity, viewers movements and gestures and other suitable activity), and viewer's physiological and emotional response to various content (e.g., viewer's heart rate, facial expressions and other responses).

The media guidance application may access a data structure (e.g., level of interest computation data structure) to determine the processing required to convert a specific indicator of interest into a level of interest. For example, the media guidance application may access a look-up table associated with a specific indicator of interest to convert the specific indicator of interest to a level of interest. In some embodiments, the media guidance application may compute the level of interest based on multiple indicators of interest. The parameters for converting an indicator of interest into a level of interest (e.g., a look-up table) may be provided by a content provider providing the given media asset, a source of the given media asset, or a third-party entity.

As an illustrative example, the media guidance application may access user behavior data associated with Jack s user profile for an amount of "Game of Thrones" that Jack has fast-forwarded through (i.e., an indicator of interest). For example, the media guidance application may determine that Jack has fast-forwarded through ten percent of "Game of Thrones." The media guidance application may execute an appropriate routine to determine the level of interest in "Game of Thrones" that fast-forwarding through ten percent of "Game of Thrones" corresponds to. For example, the media guidance application may access a look-up table to determine that, on a level of interest scale ranging from one to ten with ten corresponding to the highest level of interest, fast-forwarding through ten percent of "Game of Thrones" corresponds to a level of interest of nine. The media guidance application may similarly determine, based on user behavior data associated with Mary's user profile, that Mary's level of interest in "Game of Thrones" is four. The media guidance application may determine the first criterion (e.g., minimum threshold priority value for including a segment of the first portion in the custom summary) based on Jack's level of interest (e.g., nine). The media guidance application may determine the second criterion (e.g., minimum threshold priority value for including a segment of the second portion in the custom summary) based on Mary's level of interest (e.g., four).

In some embodiments, the media guidance application may, when determining the first criterion based on the first level of interest, retrieve a default value associated with the first criterion. The media guidance application may modify the default value based on the first level of interest. As an illustrative example, the media guidance application may retrieve (e.g., by accessing a first criterion parameters data structure) a default minimum threshold priority value associated with the first criterion (e.g., six). For example, the media guidance application may access a data structure (e.g., first criterion parameters data structure) to determine a mathematical function for modifying the default value based on the first level of interest. As an illustrative example, the media guidance application may execute a program script for modifying the default value using the mathematical function [modified default value={(first level of interest—default level of interest)/10}+default value]. The media guidance application may retrieve the default level of interest from any of storage 408, media content source 516 and media guidance data source 518. In instances where the default level of interest is five, the media guidance application may modify the threshold priority value to be 6.4.

In some embodiments, the media guidance application may update the important segments of the portion of the ordered series that has not been consumed by both users to be included in the custom summary by removing segments that are not associated with a characteristic that is of interest to at least one of the users. The media guidance application may determine, based on the first media consumption history data associated with the first user, a first characteristic that is of interest to the first user, where the first characteristic is associated with the ordered series. The characteristic that is of interest to a user may include, but is not limited to, an actor, a character, a subplot, a genre, a setting, and content rating.

The media guidance application may access a data structure (e.g., user preferences data) for characteristics of user interest with regard to a media asset. The media guidance application may extract characteristics associated with the ordered series from metadata associated with the ordered series. The media guidance application may determine characteristics associated with the ordered series that are of interest to the user by comparing characteristics of interest associated with a user with characteristics associated with the ordered series. For example, the media guidance application may determine that a first characteristic is included in both the characteristics of interest associated with the first user and the characteristics associated with the ordered series. For example, the media guidance application may determine that a characteristic of "Game of Thrones" that is of interest to Jack is the character "Daenerys Targaryen." The media guidance application may determine, based on the second media consumption history data associated with the second user, a second characteristic that is of interest to the second user, where the second characteristic is associated with the ordered series. For example, the media guidance application may determine, based on user preference data associated with Jack's user profile, that a characteristic of "Game of Thrones" that is of interest to Mary is the character "Joffrey Baratheon."

The media guidance application may determine a first set of segments of the first plurality of segments that is associated with at least one of the first characteristic and the second characteristic. The media guidance application may update the first plurality to remove segments that are not included in the first set of segments. For example, the media guidance application may access metadata associated with a segment to determine characteristics associated with the segment. The media guidance application may use a Boolean comparison function (e.g., a string compare function) to determine whether there is a match between characteristics associated with a segment and any of the first characteristic and the second characteristic. For example, the media guidance application may determine segments of the first plurality of segments that are associated with at least one of the characters "Joffrey Baratheon" and "Daenerys Targaryen." The media guidance application may update the first plurality by removing all segments that are not associated with at least one of the characters "Joffrey Baratheon" and "Daenerys Targaryen." As an illustrative example, the first plurality may include entry 116 (associated with "Daenerys Targaryen"), entry 118 (associated with "Ned Stark" and "Littlefinger") and entry 120 (associated with "Daenerys Targaryen"). The media guidance application may remove entry 118 from the first plurality of segments upon determining entry 118 is not associated with at least one of "Joffrey Baratheon" and "Daenerys Targaryen."

In some embodiments, the media guidance application may update the important segments of the second portion of the ordered series to be included in the custom summary by removing segments that are not associated with a characteristic that is of interest to the user who has not yet consumed the second portion. In some embodiments, the media guidance application may determine a second set of segments of the second plurality of segments that is associated with the second characteristic. The media guidance application may update the second plurality to remove segments that are not included in the second set of segments. As an illustrative example, the second plurality may include entry 134 (associated with "Ned Stark") and entry 146 (associated with "Ned Stark" and "Joffrey Baratheon"). The media guidance application may remove entry 134 from the second plurality of segments upon determining entry 134 is not associated with "Joffrey Baratheon."

In some embodiments, the media guidance application may update the important segments to be included in the custom summary by removing segments that are associated with a characteristic that is of interest to at least one of the users. As referred to herein, the term "spoiler segment" refers to a segment of a media asset that is associated with a media asset characteristic that is of interest to at least one of the users. In some embodiments, a criterion for selecting important segments for inclusion in a custom summary may include an indication of whether spoiler segments are to be included in the custom summary. For example, a criterion may include a "exclude spoiler segments" parameter. As an illustrative example, the media guidance application may, when determining whether to remove a segment in the custom summary, access metadata associated with the segment to determine whether the segment is a spoiler segment. The media guidance application may determine whether a segment is a spoiler segment in a manner similar to determining whether a segment is associated with a characteristic that is of interest to a user. The media guidance application may, upon determining that the segment is a spoiler, remove the segment in the custom summary. In some embodiments, the media guidance application may generate a notification that the summary does not include spoiler segments. In some embodiments, the media guidance application may generate a selectable option for accessing the spoiler segments (e.g., a fifteen second clip of "Drogo" promising "Daenerys Targaryen" to march to Westeros) or portions of the ordered series associated with the spoiler segments (e.g., a five minute clip of "Daenerys Targaryen" putting forward various reasons to "Drogo" for marching to Westeros).

The media guidance application may generate the custom summary that includes the first plurality of segments and the second plurality of segments. For example, the media guidance application may generate a custom summary of episodes five through seven of "Game of Thrones" that includes segments of episodes five and six of "Game of Thrones" that have priority values greater than eight and segments of episode seven of "Game of Thrones" that have priority values greater than six. For example, the media guidance application may generate data structure 152 that includes the first plurality of segments (e.g., entries 166, 168 and 170) and the second plurality of segments (e.g., entries 162 and 164).

The media guidance application may organize the segments in the custom summary in any suitable order. The media guidance application may access a data structure (e.g., custom summary parameters data structure) for a parameter (e.g., segment position parameter) that defines an ordering scheme for segments in the custom summary. The segment position parameter may include chronological ordering scheme, grouping segments by story line ordering scheme, grouping segments by characters ordering scheme and other suitable ordering schemes. The media guidance application may organize the segments in the custom summary to match the segment position parameter. For example, the media guidance application may include another column in data structure 152 (not shown) corresponding to a position field, where the position value associated with a segment in the custom summary corresponds to a position of the segment in the custom summary. Alternatively, the media guidance application may sort the entries in data structure 152 so that order of data structure 152 matches the segment position parameter. The media guidance application may generate for display the segments in the order in which they are organized in the custom summary.

In some embodiments, the media guidance application may modify a generated custom summary such that a duration of the modified custom summary matches a maximum duration parameter. The media guidance application may retrieve a maximum length of the custom summary, where the maximum length corresponds to a maximum duration of the custom summary. The maximum length may be pre-specified value provided by any of a content provider proving the given media asset, a source of the given media asset and the users. The media guidance application may retrieve the maximum length from any of storage 408, media content source 516 and media guidance data source 518. For example, the media guidance application may access a custom summary parameter data structure for the maximum length of the custom summary and retrieve a value of five minutes.

In some embodiments, the media guidance application may compute the maximum length based on a duration of the given media asset. Specifically, the media guidance application may determine a duration of the given media asset and compute the maximum length of the custom summary based on a pre-defined fraction of the duration of the given media asset. The pre-defined fraction may be a value provided by any of a content provider proving the given media asset, a source of the given media asset and the users. The media guidance application may retrieve (e.g., by accessing the custom summary parameter data structure) the pre-defined fraction from any of storage 408, media content source 516 and media guidance data source 518. For example, the media guidance application may determine, based on parameters for displaying custom summaries, that the maximum length of a custom summary is one-tenth of a duration of a given media asset. The media guidance application may determine, based on metadata associated with episode eight of "Game of Thrones" or program listings information for episode eight of "Game of Thrones," that episode eight of "Game of Thrones" is sixty minutes long, and accordingly the media guidance application may compute the maximum length to be six minutes.

The media guidance application may determine a first length corresponding to a total duration of the first plurality of segments and a second length corresponding to a total duration of the second plurality of segments. The media guidance application may compute a new first length and a new second length, where the new first length and the new second length combined equal to the maximum length, and where a ratio of the new first length to the new second length is equal to a ratio of the first length to the second length. The media guidance application may extract a duration of each segment of the first plurality of segments from the respective metadata and combine the durations to compute the first length. The media guidance application may determine the second length in a manner similar to determining the first length. For example, the media guidance application may determine the first length of segments corresponding to episode seven of "Game of Thrones" is six minutes and second length of segments corresponding to episodes five and six of "Game of Thrones" is four minutes. For the case where the maximum length is five minutes, the media guidance application may compute the new first length to be three minutes and the new second length to be two minutes.

The media guidance application may select a combination of segments for inclusion in the custom summary such that the total duration of the combination is closest to the maximum length. Specifically, the media guidance application may determine a first combination of segments of media assets in the first plurality of segments, where a difference between a total duration of the first combination of segments and the new first length is less than a difference between a total duration of any other combination of segments of the first plurality of segments and the new first length. The media guidance application may determine a second combination of segments of media assets in the first plurality of segments, where a difference between a total duration of the second combination of segments and the new second length is less than a difference between a total duration of any other combination of segments of the second plurality of segments and the new second length. The media guidance application may update the custom summary by removing segments not included in the first combination of segments, and by removing segments not included in the second combination of segments.

For example, the media guidance application may execute a program to determine all possible combinations for a given set of segments. As an illustrative example, the media guidance application may determine that the first plurality of segments corresponding to episode seven of "Game of Thrones" includes three segments: segment corresponding to entry 166, with a duration of one minute;

segment corresponding to entry 168, with a duration of two minutes; and segment corresponding to entry 170, with a duration of three minutes. The media guidance application may determine, by executing the appropriate program, that the possible combinations are: segments corresponding to entries 166 & 168, with a total duration of three minutes; segments corresponding to entries 166 & 170, with a total duration of four minutes; segments corresponding to entries 168 & 170, with a total duration of five minutes; and segments corresponding to entries 166, 168 & 170, with a total duration of six minutes.

The media guidance application may compute a difference between a duration of each combination and the first length to generate a list of differences. The media guidance application may then sort the list of differences to determine the minimum difference and select the combination corresponding to the minimum difference. Alternatively, the media guidance application may iteratively compute a difference between duration of a given combination and the first length and compare the calculated difference with a minimum difference value. If the calculated difference is less than the minimum difference value, the media guidance application may update the minimum difference value with the calculated difference and a "combination to be selected" field with the given combination. For example, the media guidance application may determine that the difference between the total duration of segments corresponding to entries 166 & 168 and the first length (e.g., zero minutes) is the minimum difference, and update the custom summary by removing segment corresponding to entry 170.

As an illustrative example, the media guidance application may determine that the second plurality of segments corresponding to episode five and six of "Game of Thrones" includes two segments: segment corresponding to entry 162, with a duration of one and half minutes; and segment corresponding to entry 164, with a duration of two and half minutes. The media guidance application may determine that the possible combinations are segment corresponding to entry 162, segment corresponding to entry 164 and segments corresponding to entries 162 & 164. In this case, the media guidance application may determine that segment corresponding to entry 162 is the only possible combination which has a duration that does not exceed the second length. Accordingly, the media guidance application may update the custom summary by removing segment corresponding to entry 164.

In some embodiments, the media guidance application may include, in the custom summary, a portion of the ordered series not consumed by the first user and a portion of the ordered series not consumed by the second user. The media guidance application may determine, based on comparing the media assets in the first set with the media assets in the second set, a third portion of media assets in the ordered series that the first user has not yet consumed but the second user has consumed. For example, the media guidance application may determine that a list of media assets preceding episode eight in "Game of Thrones" that Jack has not yet watched includes episodes one and seven. The media guidance application may determine that a list of media assets preceding episode eight in "Game of Thrones" that Mary has not yet watched includes episodes five through seven. The media guidance application may identify, based on comparing the two lists, episode one of "Game of Thrones" as the third portion that Jack has not yet consumed, but Mary has consumed.

The media guidance application may retrieve a third criterion for determining whether to include, in the custom summary, a segment of a media asset that is associated with the third portion of media assets, where the first criterion is less restrictive than the third criterion. The third criterion may be provided a content provider providing the given media asset, source of the given media asset or any of the users. The media guidance application may retrieve (e.g., by accessing a custom summary parameter data structure) the third criterion from any of storage 408, media content source 516 and media guidance data source 518. In some embodiments, the third criterion may be the same as the second criterion. For example, the third criterion may include a minimum threshold priority value for including a segment of the third portion in the custom summary. For example, the first criterion may include a threshold priority value of six, corresponding to episode seven of "Game of Thrones". The media guidance application may retrieve a threshold priority value of seven for episode one of "Game of Thrones."

The media guidance application may compare each priority value that is associated with a respective segment of a media asset in the third portion of media assets with the third criterion. The media guidance application may determine, based on comparing each priority value that is associated with the respective segment of each media asset in the third portion of media assets with the third criterion, a third plurality of segments of media assets that are included the third portion of media assets, where each segment in the third plurality of segments is associated with a priority value that matches the third criterion. The media guidance application may include the third plurality of segments in the custom summary. The media guidance application may determine, in a manners similar to determining the first plurality of segments and the second plurality of segments, segments of episode one of "Game of Thrones" that have priority values higher than seven and include these segments in the custom summary.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

Figure 3:
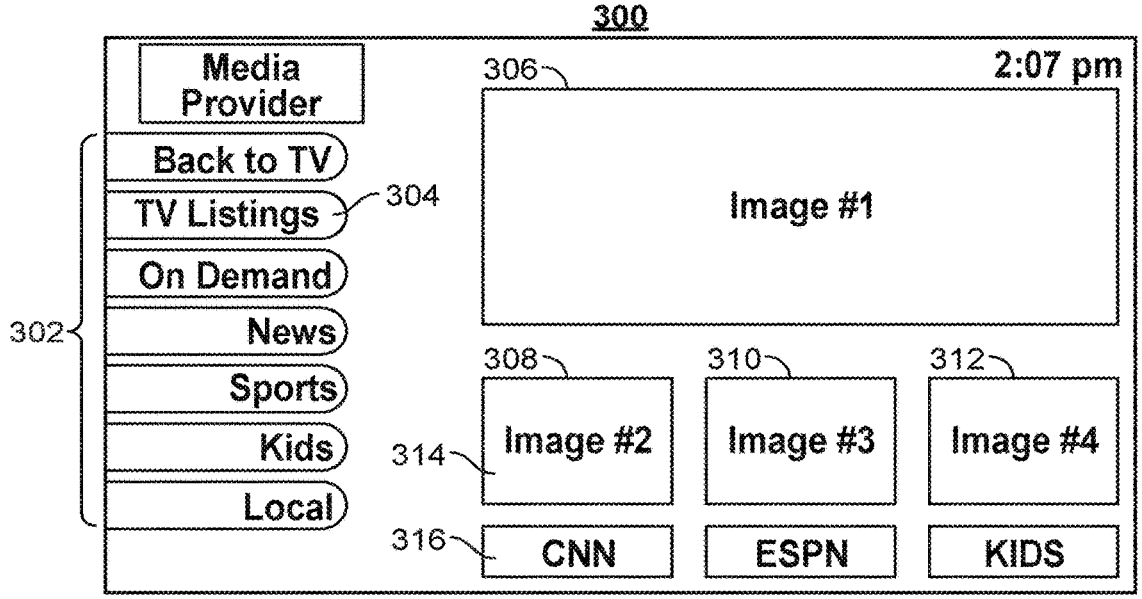
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
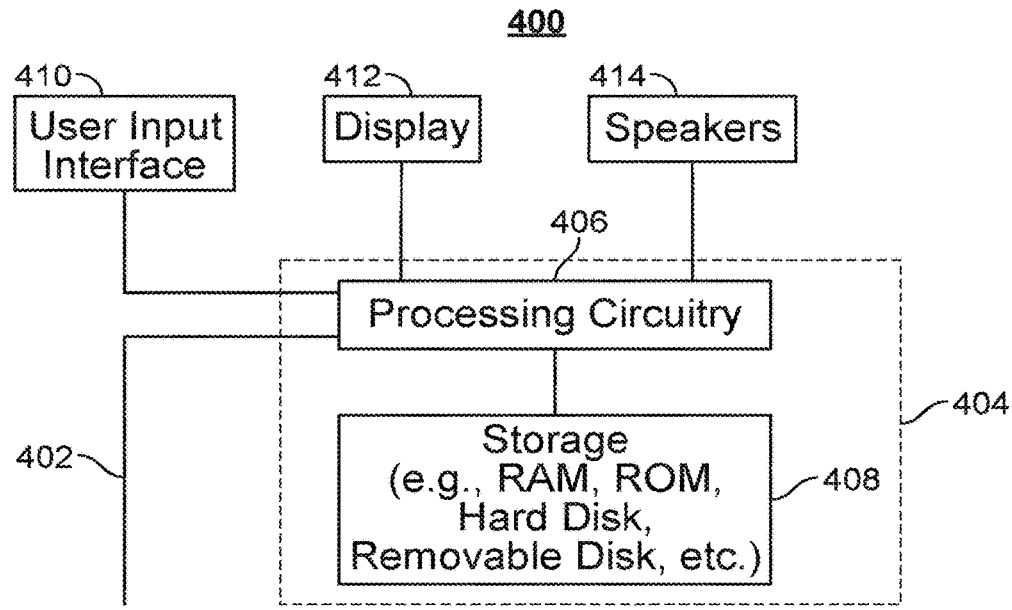
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
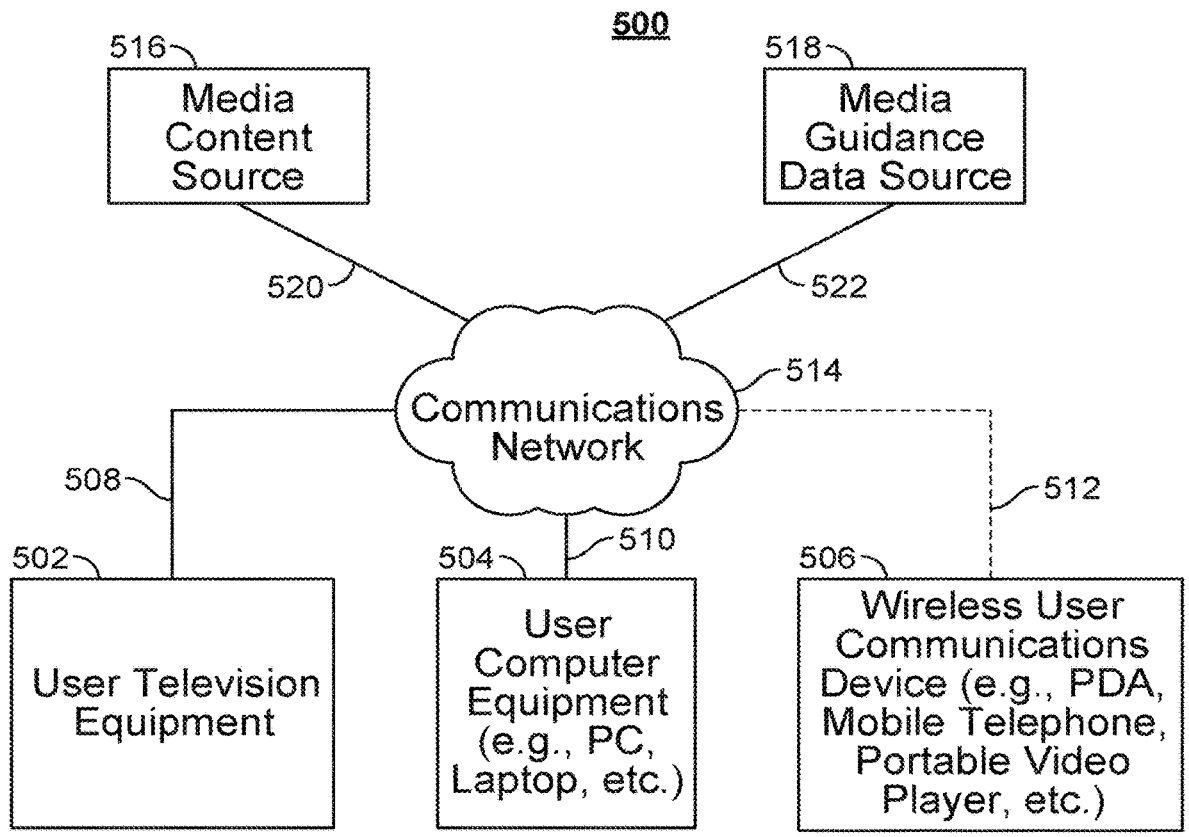
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data.

For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a web site via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

Figure 6:
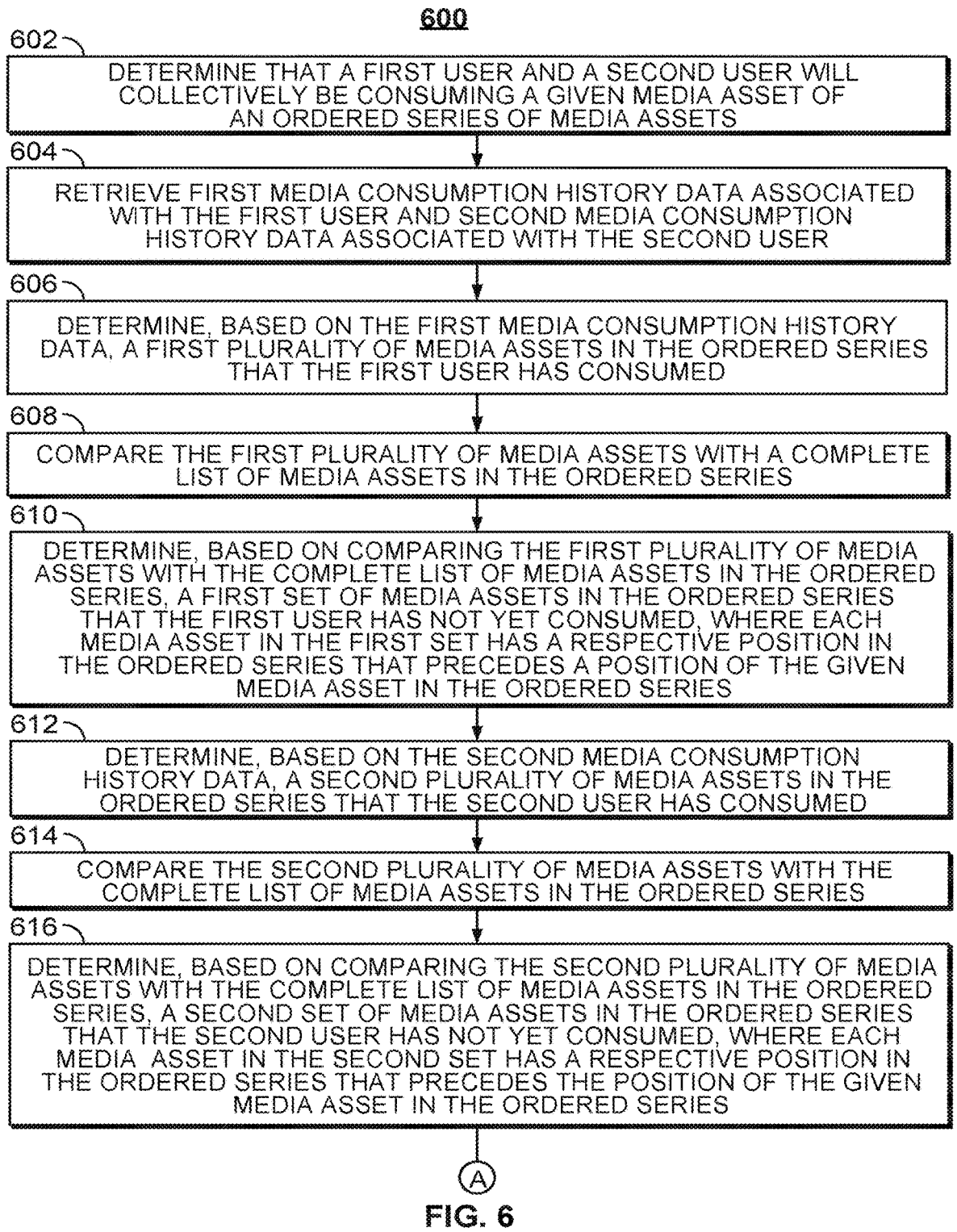
FIG. 6 is a flowchart of illustrative steps involved in generating a custom summary for a first user and a second user, in accordance with some embodiments of the disclosure.
Figure 6:
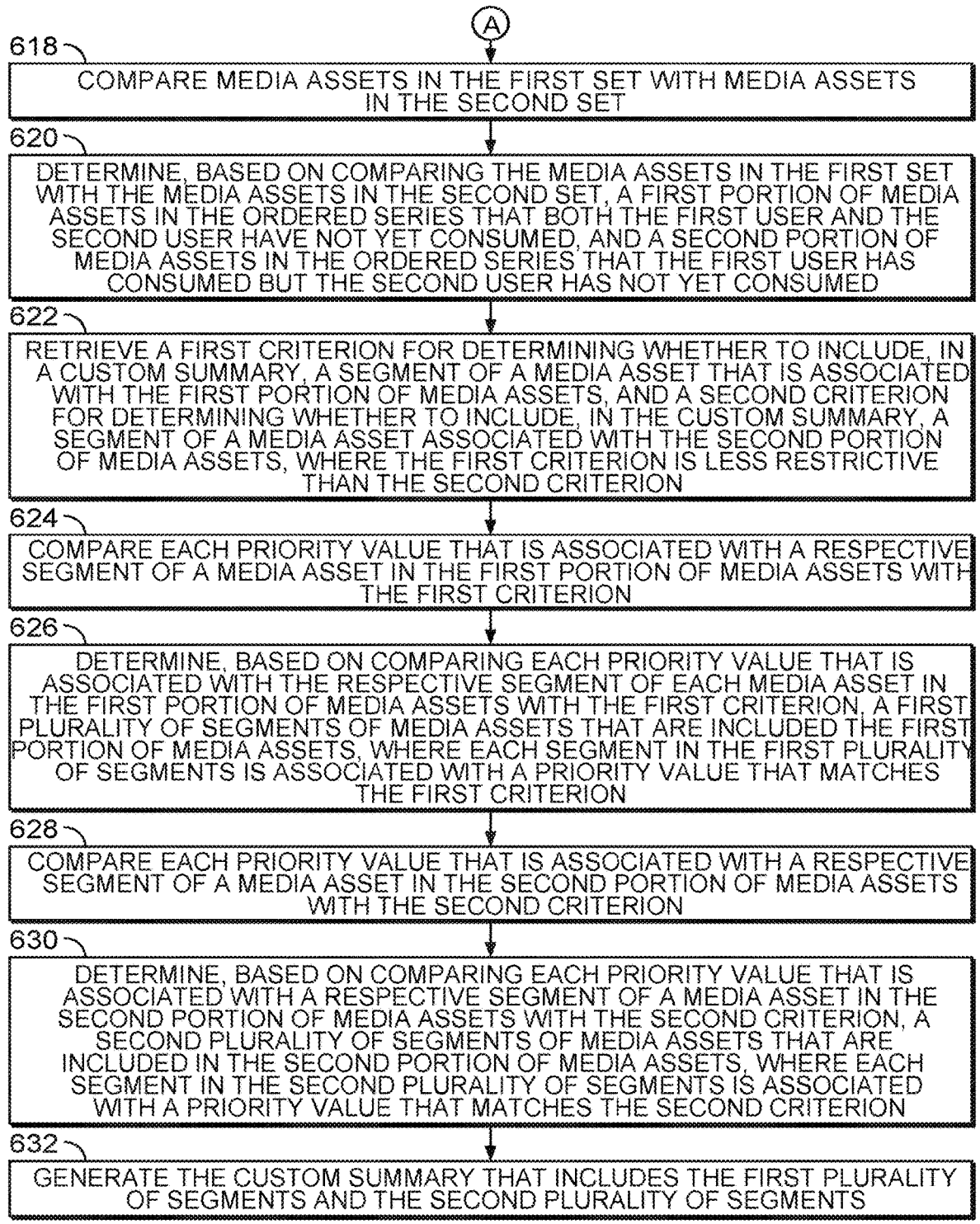

FIG. 6 is a flowchart of illustrative steps involved in generating a custom summary for a first user and a second user, in accordance with some embodiments of the disclosure. Process 600 may be executed by control circuitry 404 (FIG. 4) as instructed by the media guidance application. Control circuitry 404 may be implemented on user equipment 502, 504, and/or 506 (FIG. 5). In addition, one or more steps of process 600 may be incorporated into or combined with one or more steps of any other process or embodiment.

Process 600 begins at 602, where control circuitry 404 determines that a first user and a second user will collectively be consuming a given media asset of an ordered series of media assets. For example, control circuitry 404 may determine that Jack and Mary are about to watch episode eight of the series "Game of Thrones" on the same user equipment (e.g., user television equipment 502, user computer equipment 504, wireless user communications device 506). The media guidance application may make the determination in any manner, including by performing actions described with respect to FIG. 1. Process 600 continues to 604, where control circuitry 404 retrieves first media consumption history data associated with the first user and second media consumption history data associated with the second user. For example, control circuitry 404 may access a data structure (located at any of storage 408, media content source 516 and media guidance source 518) associated with Jack's user profile for a list of media assets watched by Jack. Control circuitry 404 may access a data structure (located at any of storage 408, media content source 516 and media guidance source 518) associated with Mary's user profile for a list of media assets watched by Mary. For example, control circuitry 404 may retrieve a list of media assets watched by Jack from Jack's user profile and a list of media assets watched by Mary from Mary's user profile. Control circuitry 404 may access media consumption history data stored locally (e.g., in storage 408) and/or at a remote location (e.g., media content source 516 accessible via communications network 520 or media guidance source 518 accessible via communications network 522).

Process 600 continues to 606, where control circuitry 404 determines, based on the first media consumption history data, a first plurality of media assets in the ordered series that the first user has consumed. For example, control circuitry 404 determine, based on the list of media assets watched by Jack, that Jack has watched episodes two through six of the series "Game of Thrones." Control circuitry 404 may perform this determination as discussed with respect to FIG. 1 and elsewhere in this application. Process 600 continues to 608, where control circuitry 404 compares the first plurality of media assets with a complete list of media assets in the ordered series. Control circuitry 404 may retrieve (e.g., by querying a database), from any of storage 408, media content source 516 and media guidance data source 518, a complete episode list that indicates that the series "Game of Thrones" includes episodes one through ten. Control circuitry 404 may determine, based on the complete episode list, a list of all media assets in the ordered series that precede the given media asset. For example, control circuitry 404 may determine that episodes one through seven precede episode eight. Control circuitry 404 may perform this action as discussed with respect to FIG. 1 and elsewhere in this application.

Process 600 continues to 610, where control circuitry 404 determines, based on comparing the first plurality of media assets with the complete list of media assets in the ordered series, a first set of media assets in the ordered series that the first user has not yet consumed, where each media asset in the first set has a respective position in the ordered series that precedes a position of the given media asset in the ordered series. For example, control circuitry 404 may compare the media assets in the list of media assets watched by Jack with the media assets in the list of all episodes of the series "Game of Thrones" that precede episode eight and determine that Jack has not watched episodes one and seven of "Game of Thrones." Control circuitry 404 may perform this action as discussed with respect to FIG. 1 and elsewhere in this application.

Process 600 continues to 612, where control circuitry 404 determines, based on the second media consumption history data, a second plurality of media assets in the ordered series that the second user has consumed. For example, control circuitry 404 may determine that Mary has watched episodes one through four of the series "Game of Thrones." Process 600 continues to 614, where control circuitry 404 compares the second plurality of media assets with the complete list of media assets in the ordered series. Process 600 continues to 616, where control circuitry 404 determines, based on comparing the second plurality of media assets with the complete list of media assets in the ordered series, a second set of media assets in the ordered series that the second user has not yet consumed, where each media asset in the second set has a respective position in the ordered series that precedes the position of the given media asset in the ordered series. For example, control circuitry 404 may determine, based on comparing the list of media assets watched by Mary and the list of all episodes of the series "Game of Thrones" that precede episode eight, that Mary has not watched episodes five through seven of "Game of Thrones." Control circuitry 404 may perform this action as discussed with respect to FIG. 1 and elsewhere in this application.

Process 600 continues to 618, where control circuitry 404 compare media assets in the first set with media assets in the second set. Process 600 continues to 620, where control circuitry 404 determines, based on comparing the media assets in the first set with the media assets in the second set, a first portion of media assets in the ordered series that both the first user and the second user have not yet consumed, and a second portion of media assets in the ordered series that the first user has consumed but the second user has not yet consumed. For example, control circuitry 404 may generate data structure 100 for the first portion and data structure 122 for the second portion. For example, control circuitry 404 may include information about segments in episode seven of "Game of Thrones" in data structure 100 and information about segments in episodes five and six of "Game of Thrones" in data structure 122. Control circuitry 404 may perform this action as discussed with respect to FIG. 1 and elsewhere in this application.

Process 600 continues to 622, where control circuitry 404 retrieves a first criterion for determining whether to include, in a custom summary, a segment of a media asset that is associated with the first portion of media assets, and a second criterion for determining whether to include, in the custom summary, a segment of a media asset associated with the second portion of media assets, where the first criterion is less restrictive than the second criterion. For example, control circuitry 404 may retrieve (e.g., by accessing a first criterion parameters data structure located at any of storage 408, media content source 516 and media guidance data source 518) a threshold priority value of six for episode seven of "Game of Thrones." Control circuitry 404 may retrieve (e.g., by accessing a second criterion parameters data structure located at any of storage 408, media content source 516 and media guidance data source 518) a threshold priority value of eight for episodes five and six of "Game of Thrones." Control circuitry 404 may perform this action as discussed with respect to FIG. 1 and elsewhere in this application.

Process 600 continues to 624, where control circuitry 404 compares each priority value that is associated with a respective segment of a media asset in the first portion of media assets with the first criterion. For example, control circuitry 404 may access, in manners described previously, data structure 100 for entries associated with priority values higher than six. Process 600 continues to 626, where control circuitry 404 determine, based on comparing each priority value that is associated with the respective segment of each media asset in the first portion of media assets with the first criterion, a first plurality of segments of media assets that are included the first portion of media assets, where each segment in the first plurality of segments is associated with a priority value that matches the first criterion. For example, control circuitry 404 may include entries 116, 118 and 120, which are associated with priority values seven, nine and seven respectively, in the first plurality of segments. Control circuitry 404 may perform this action as discussed with respect to FIG. 1 and elsewhere in this application.

Process 600 continues to 628, where control circuitry 404 compares each priority value that is associated with a respective segment of a media asset in the second portion of media assets with the second criterion. Process 600 continues to 630, where control circuitry 404 determine, based on comparing each priority value that is associated with a respective segment of a media asset in the second portion of media assets with the second criterion, a second plurality of segments of media assets that are included in the second portion of media assets, where each segment in the second plurality of segments is associated with a priority value that matches the second criterion. For example, control circuitry 404 may access data structure 122 for entries that are associated with priority values higher than eight and include entries 134 and 146, which are associated with priority values nine and ten, respectively, in the second plurality of segments. Control circuitry 404 may perform this action as discussed with respect to FIG. 1 and elsewhere in this application.

Process 600 continues to 632, where control circuitry 404 generates the custom summary that includes the first plurality of segments and the second plurality of segments. For example, control circuitry 404 may generate data structure 152 that includes the first plurality of segments (e.g., entries 166, 168 and 170) and the second plurality of segments (e.g., entries 162 and 164). Control circuitry 404 may perform this action as discussed with respect to FIG. 1 and elsewhere in this application.

Figure 7:
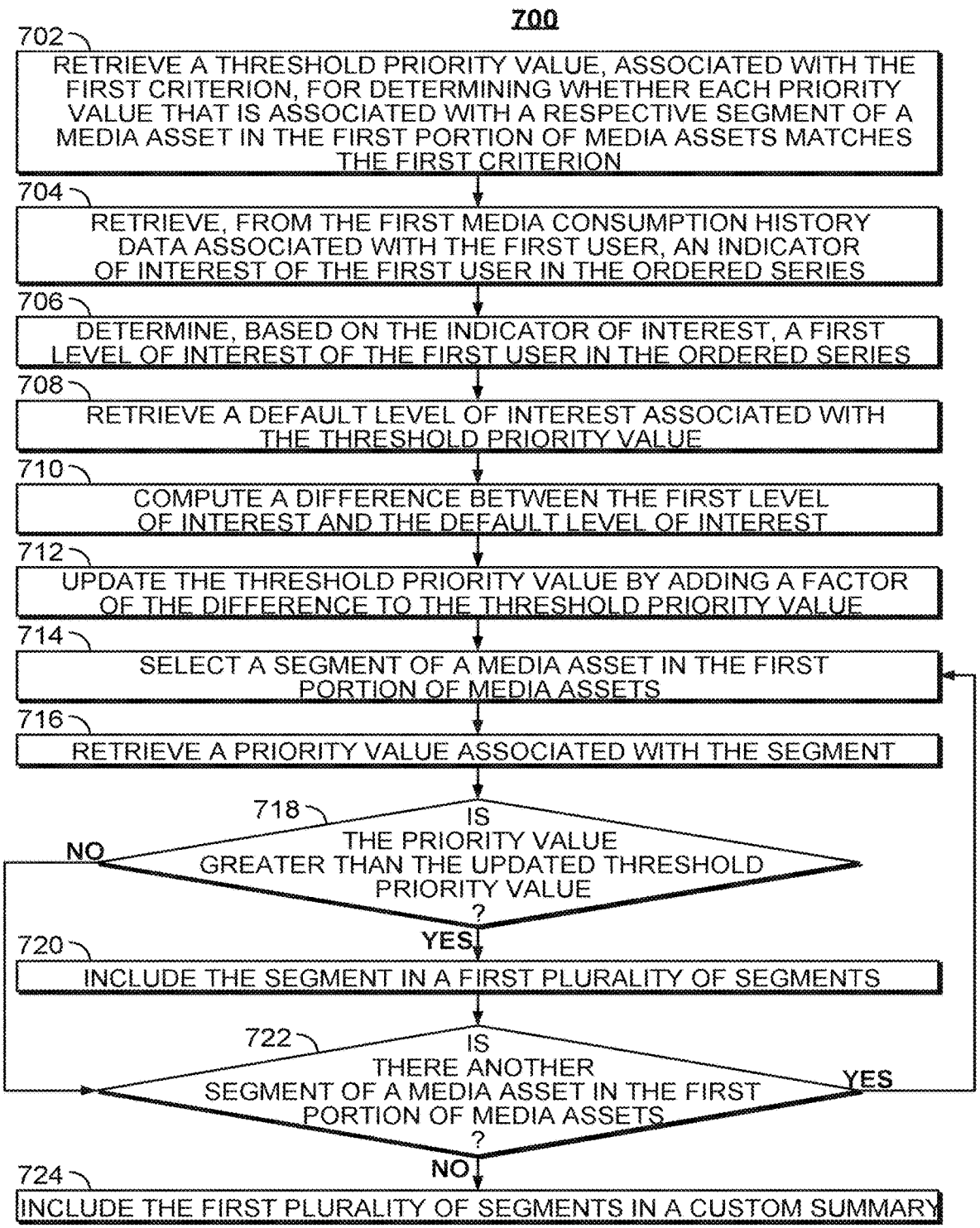
FIG. 7 is a flowchart of illustrative steps involved in determining segments of a media asset in the first portion of media assets for inclusion in the custom summary, in accordance with some embodiments of the disclosure.

FIG. 7 is a flowchart of illustrative steps involved in determining segments of a media asset in the first portion of media assets for inclusion in the custom summary, in accordance with some embodiments of the disclosure. Process 700 may be executed by control circuitry 404 (FIG. 4) as instructed by the media guidance application. Control circuitry 404 may be implemented on user equipment 502, 504, and/or 506 (FIG. 5). In addition, one or more steps of process 700 may be incorporated into or combined with one or more steps of any other process or embodiment.

Process 700 begins at 702, where control circuitry 404 retrieves a threshold priority value, associated with the first criterion, for determining whether each priority value that is associated with a respective segment of a media asset in the first portion of media assets matches the first criterion. For example, control circuitry 404 may retrieve threshold priority value of six from any of storage 408, media content source 516 and media guidance data source 518. Process 700 continues to 704, where control circuitry 404 retrieves, from the first media consumption history data associated with the first user, an indicator of interest of the first user in the ordered series. For example, control circuitry 404 may access user behavior data associated with Jack s user profile for an amount of "Game of Thrones" that Jack has fast-forwarded through (i.e., an indicator of interest). For example, control circuitry 404 may determine that Jack has fast-forwarded through ten percent of "Game of Thrones." Process 700 continues to 706, where control circuitry 404 determines, based on the indicator of interest, a first level of interest of the first user in the ordered series. For example, control circuitry 404 may access a look-up table to determine that, on a level of interest scale ranging from one to ten with ten corresponding to the highest level of interest, fast-forwarding through ten percent of "Game of Thrones" corresponds to a level of interest of nine.

Process 700 continues to 708, where control circuitry 404 retrieves a default level of interest associated with the threshold priority value. For example, control circuitry 404 may retrieve (e.g., by accessing a custom summary parameters data structure) a default level of interest of five. Process 700 continues to 710, where control circuitry 404 computes a difference between the first level of interest and the default level of interest. For example, control circuitry 404 may compute the difference to be four. Process 700 continues to 712, where control circuitry 404 updates the threshold priority value by adding a factor of the difference to the threshold priority value. For example, control circuitry 404 may retrieve (e.g., by accessing a custom summary parameters data structure) a value of one-tenth for the factor and accordingly, control circuitry 404 may update the threshold priority value to 6.4.

Process 700 continues to 714, where control circuitry 404 selects a segment of a media asset in the first portion of media assets. For example, control circuitry 404 may select a segment corresponding to entry 112 in data structure 100. Process 700 continues to 716, where control circuitry 404 retrieves a priority value associated with the segment. For example, control circuitry 404 may determine segment corresponding to entry 112 has a priority value of four. Process 700 continues to 718, where control circuitry 404 determines whether the priority value is greater than the updated threshold priority value. If, at 718, control circuitry 404 determines that the priority value is greater than the updated threshold priority value, process 700 continues to 720. At 720, control circuitry 404 includes the segment in a first plurality of segments. If, at 718, control circuitry 404 determines that the priority value is not greater than the updated threshold priority value, process 700 continues to 722. For example, control circuitry 404 may determine, by executing a Boolean comparison function, that priority value associated with segment corresponding to entry 112 does not exceed the updated threshold priority value. Process 700 continues to 722 from 720. At 722, control circuitry 404 determines whether there is another segment of a media asset in the first portion of media assets.

If, at 722, control circuitry 404 determines that there is another segment of a media asset in the first portion of media assets, process 700 reverts to 714. For example, control circuitry 404 may determine data structure 100 also includes entries 114, 116, 118 and 120. If, at 722, control circuitry 404 determines that there is no other segment of a media asset in the first portion of media assets, process 700 continues to 724. At 724, control circuitry 404 includes the first plurality of segments in a custom summary. Control circuitry 404 may use a process similar to process 700 for determining segments of a media asset in the second portion of media assets for inclusion in the custom summary.

Figure 8:
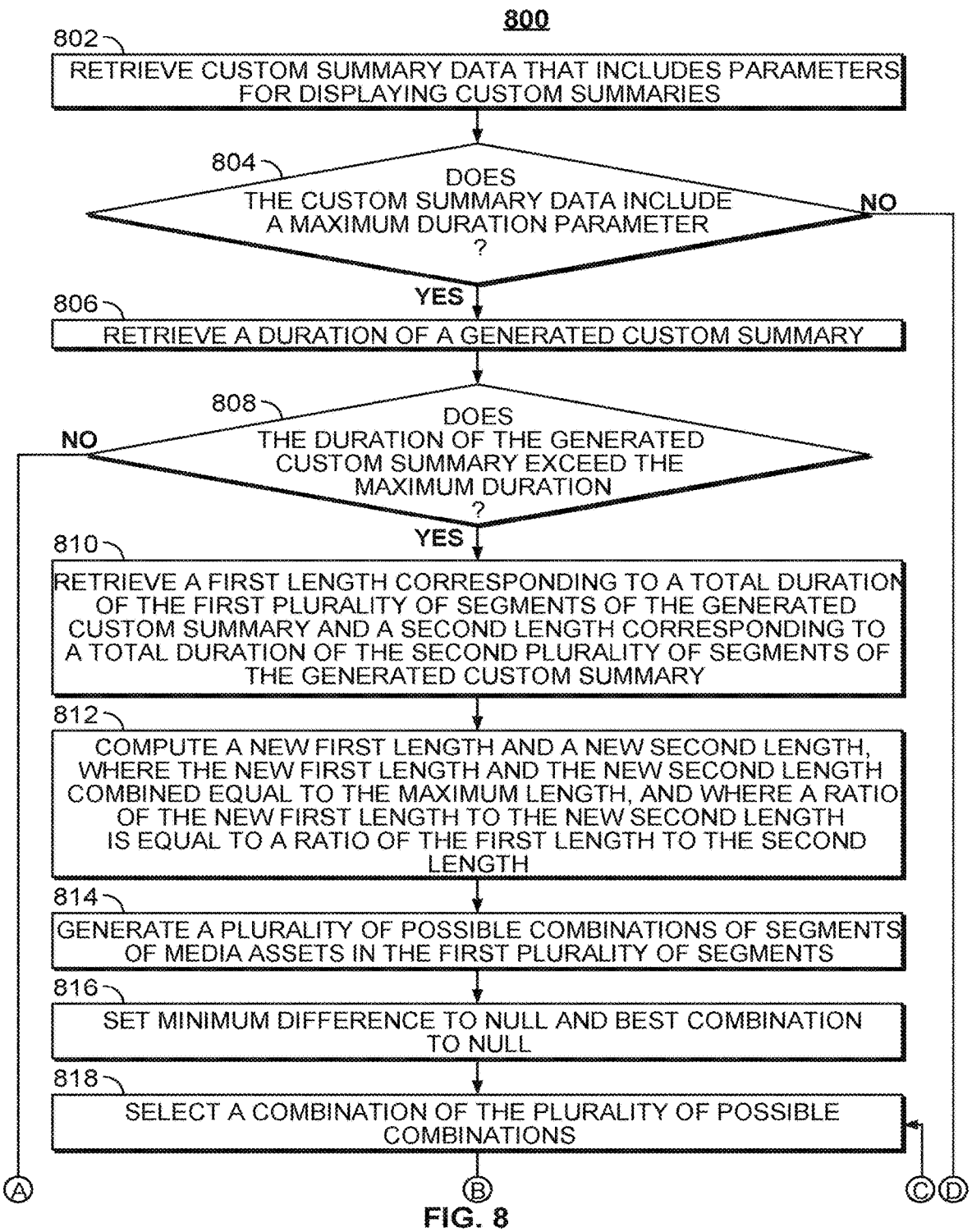
FIG. 8 is a flowchart of illustrative steps involved in modifying a custom summary so that the duration of the custom summary matches a maximum duration parameter, in accordance with some embodiments of the disclosure.
Figure 8:
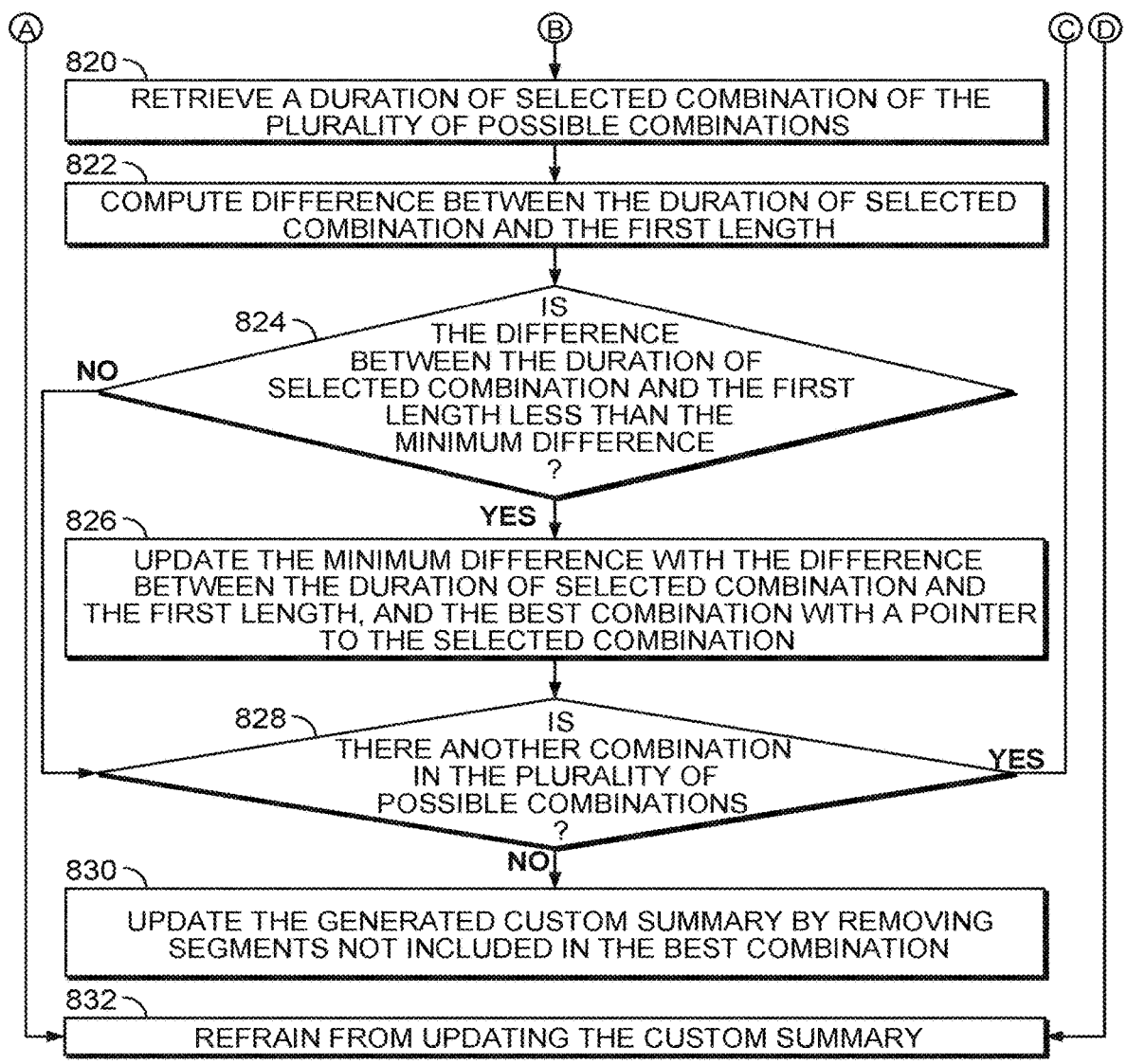

FIG. 8 is a flowchart of illustrative steps involved in modifying a custom summary so that the duration of the custom summary matches a maximum duration parameter, in accordance with some embodiments of the disclosure. Process 800 may be executed by control circuitry 404 (FIG. 4) as instructed by the media guidance application. Control circuitry 404 may be implemented on user equipment 502, 504, and/or 506 (FIG. 5). In addition, one or more steps of process 800 may be incorporated into or combined with one or more steps of any other process or embodiment.

Process 800 begins at 802 where control circuitry 404 retrieves custom summary data that includes parameters for displaying custom summaries. For example, control circuitry 404 may access any of storage 408, media content source 516 and media guidance data source 518 for the custom summary data. Process 800 continues to 804, where control circuitry 404 determines whether the custom summary data includes a maximum duration parameter. If, at 804, control circuitry 404 determines that the custom summary data does not include a maximum duration parameter, process 800 continues to 834. At 834, control circuitry 404 refrains from updating the custom summary.

If, at 804, control circuitry 404 determines that the custom summary data does include a maximum duration parameter, process 800 continues to 806. At 806, control circuitry 404 retrieves a duration of a generated custom summary. For example, control circuitry 404 may access the custom summary data for the maximum duration parameter and retrieve a value of five minutes. For example, control circuitry 404 may determine a duration of a generated custom summary to be ten minutes. Process 800 continues to 808, where control circuitry 404 determines whether the duration of the generated custom summary exceeds the maximum duration. If, at 808, control circuitry 404 determines that the duration of the generated custom summary does not exceed the maximum duration, process 800 continues to 834. At 834, control circuitry 404 refrains from updating the custom summary If, at 808, control circuitry 404 determines that the duration of the generated custom summary exceeds the maximum duration, process 800 continues to 810. At 810, control circuitry 404 retrieves a first length corresponding to a total duration of the first plurality of segments of the generated custom summary and a second length corresponding to a total duration of the second plurality of segments of the generated custom summary. Process 800 continues to 812, where control circuitry 404 computes a new first length and a new second length, where the new first length and the new second length combined equal to the maximum length, and where a ratio of the new first length to the new second length is equal to a ratio of the first length to the second length. For example, control circuitry 404 may determine the first length of segments corresponding to episode seven of "Game of Thrones" is six minutes and second length of segments corresponding to episodes five and six of "Game of Thrones" is four minutes. For the case where the maximum length is five minutes, control circuitry 404 may compute the new first length to be three minutes and the new second length to be two minutes.

Process 800 continues to 814, where control circuitry 404 generates a plurality of possible combinations of segments of media assets in the first plurality of segments. For example, control circuitry 404 may determine, by accessing data structure 152, that the first plurality of segments corresponding to episode seven of "Game of Thrones" includes three segments: segment corresponding to entry 166, segment corresponding to entry 168, and segment corresponding to entry 170. Control circuitry 404 may input segments of the first plurality into a program script to determine that the possible combinations are: segments corresponding to entries 166 & 168, segments corresponding to entries 166 & 170, segments corresponding to entries 168 & 170, and segments corresponding to entries 166, 168 & 170.

Process 800 continues to 816, where control circuitry 404 sets minimum difference to null and best combination to null. Control circuitry 404 may store minimum difference and the best combination values locally (e.g., storage 408) or remotely (e.g., media content source 516 and media guidance data source 518). Process 800 continues to 818, where control circuitry 404 selects a combination of the plurality of possible combinations. For example, control circuitry 404 may select the combination of segments corresponding to entries 166 & 168. Process 800 continues to 820, where control circuitry 404 retrieves duration of selected combination of the plurality of possible combinations. For example, control circuitry 404 may retrieve a duration of three minutes for the combination of segments corresponding to entries 166 & 168.

Process 800 continues to 822, where control circuitry 404 computes difference between the duration of selected combination and the first length. For example, control circuitry 404 may compute the difference between combination of segments corresponding to entries 166 & 168 and the first length to be zero minutes. Process 800 continues to 824, where control circuitry 404 determines whether the difference between the duration of selected combination and the first length less than the minimum difference. If, at 824, control circuitry 404 determines that the difference between the duration of selected combination and the first length less than the minimum difference, process 800 continues to 826. At 826, control circuitry 404 updates the minimum difference with the difference between the duration of selected combination and the first length, and the best combination with a pointer to the selected combination. For example, control circuitry 404 may update the minimum difference to zero minutes, and the best combination with a pointer to the combination of segments corresponding to entries 166 & 168.

If, at 824, control circuitry 404 determines that the difference between the duration of selected combination and the first length is not less than the minimum difference, process 800 continues to 828. Process 800 also continues to 828 from 826. At 828, control circuitry 404 determines whether there is another combination in the plurality of possible combinations. If, at 828, control circuitry 404 determines that there is another combination in the plurality of possible combinations, process 800 reverts to 818. At 818, control circuitry 404 selects a combination of the plurality of possible combinations. If, at 828, control circuitry 404 determines that there is no other combination in the plurality of possible combinations, process 800 continues to 830. At 830, control circuitry 404 updates the generated custom summary by removing segments not included in the best combination. For example, for the case that the best combination is combination of segments corresponding to entries 166 & 168, control circuitry 404 may remove entry 170 from data structure 152.

FIG. 9 is flowchart of illustrative steps involved in generating a custom summary based on a first user's and a second user's progress through an ordered series, in accordance with some embodiments of the disclosure. Process 900 may be executed by control circuitry 404 (FIG. 4) as instructed by the media guidance application. Control circuitry 404 may be implemented on user equipment 502, 504, and/or 506 (FIG. 5). In addition, one or more steps of process 900 may be incorporated into or combined with one or more steps of any other process or embodiment.

Process 900 begins at 902 where control circuitry 404 identifies a first user and a second user who will collectively be consuming a given media asset of an ordered series of media assets. For example, control circuitry 404 may determine that Jack and Mary are about to watch episode eight of the series "Game of Thrones" on the same user equipment (e.g., user television equipment 502, user computer equipment 504, wireless user communications device 506). The media guidance application may make the determination in any manner, including by performing actions described with respect to FIG. 1. Process 900 continues to 904 where control circuitry 404 identifies a first portion of the ordered series that both the first user and the second user have not consumed, and a second portion of the ordered series that the first user has consumed but the second user has not yet consumed, where both the first portion and the second portion precede the given media asset in the ordered series. For example, control circuitry 404 may determine that both Jack and Mary have not watched episode seven of "Game of Thrones." The control circuitry 404 may determine that Jack has watched episodes five and six of "Game of Thrones" and Mary has not yet watched episodes five and six of "Game of Thrones." Control circuitry 404 may perform this action as discussed with respect to FIG. 1 and elsewhere in this application. Process 900 continues to 906 where control circuitry 404 generates a custom summary that includes a first summary of the first portion and a second summary of the second portion, where the first summary is more detailed than the second summary. For example, control circuitry 404 may generate the custom summary that includes a two minutes summary of episode seven of "Game of Thrones" and a one minute summary of episodes five and six of "Game of Thrones." Control circuitry 404 may perform this action as discussed with respect to FIG. 1 and elsewhere in this application.

Figure 10:
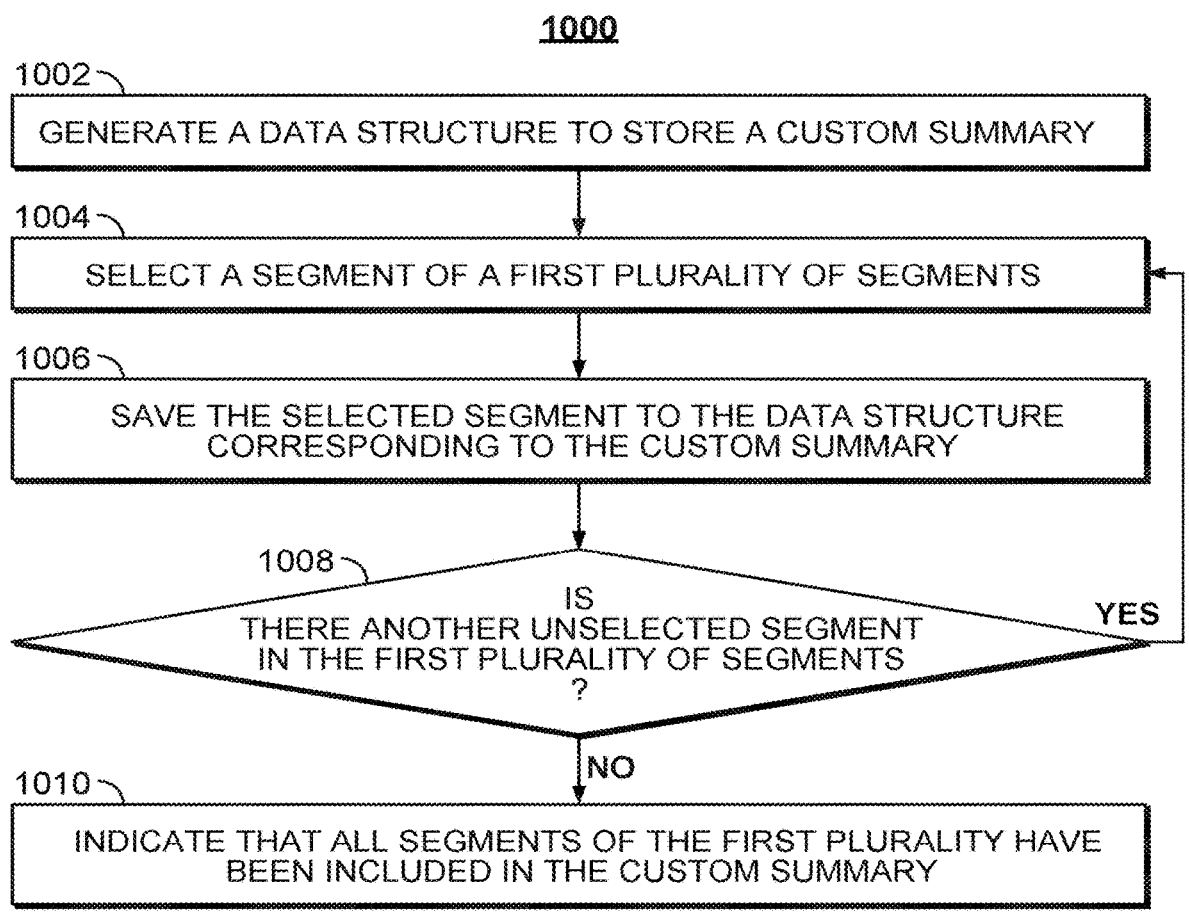
FIG. 10 is a flowchart of illustrative steps involved in including a first plurality of segments, that are included the first portion of media assets, in the custom summary, in accordance with some embodiments of the disclosure.

FIG. 10 is a flowchart of illustrative steps involved in including a first plurality of segments, that are included the first portion of media assets, in the custom summary, in accordance with some embodiments of the disclosure. Process 1000 may be executed by control circuitry 404 (FIG. 4) as instructed by the media guidance application. Control circuitry 404 may be implemented on user equipment 502, 504, and/or 506 (FIG. 5). In addition, one or more steps of process 1000 may be incorporated into, or combined with, one or more steps of any other process or embodiment.

Process 1000 begins at 1002 where control circuitry 404 generates a data structure to store a custom summary. For example, control circuitry 404 may generate data structure 152. Process 1000 continues to 1004 where control circuitry 404 selects a segment of a first plurality of segments. As an illustrative example, control circuitry 404 may select the segment associated with the segment ID "PS23." Control circuitry 404 may perform this action as discussed with respect to FIG. 1 and elsewhere in this application. Process 1000 continues to 1006 where control circuitry 404 saves the selected segment to the data structure corresponding to the custom summary. For example, control circuitry 404 may save an entry corresponding to the segment associated with the segment ID "PS23" as entry 166 in data structure 152. Process 1000 continues to 1008 where control circuitry 404 determines whether there is another unselected segment in the first plurality of segments. For example, control circuitry 404 may determine that the first plurality includes two unselected segments associated with segment IDs "YU54" and "SJ34." Control circuitry 404 may perform this action as discussed with respect to FIG. 1 and elsewhere in this application. If, at 1008, control circuitry 404 determines that there is another unselected segment in the first plurality of segments, process 1000 reverts to 1004. If, at 1008, control circuitry 404 determines that there is no other unselected segment in the first plurality of segments, process 1000 continues to 1010. At 1010, control circuitry 404 indicates that all segments of the first plurality have been included in the custom summary. For example, control circuitry 404 may update the value of a "have all segments of the first plurality been included in the custom summary?" flag from "false" to "true." Control circuitry 404 may perform this action as discussed with respect to FIG. 1 and elsewhere in this application. Control circuitry 404 may use a process similar to process 1000 for including the second plurality of segments, that are included in the second portion of media assets, in the custom summary.

It should be noted that processes 600-1000 or any step thereof could be performed on, or provided by, any of the devices shown in FIGS. 4-5. For example, any of processes 600-1000 may be executed by control circuitry 404 (FIG. 4) as instructed by the media guidance application implemented on user equipment 502, 504, and/or 506 (FIG. 5). In addition, one or more steps of process 600-1000 may be incorporated into or combined with one or more steps of any other process or embodiment.

It is contemplated that the steps or descriptions of FIGS. 6-10 may be used with any other embodiment of this disclosure. In addition, the steps and descriptions described in relation to FIG. 6-10 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating a customized summary for media assets in a series, the method comprising:
 retrieving, by control circuitry, a fast-forwarding amount that relates to the fast-forwarding of at least a portion of the series in association with a user profile;
 determining a level of interest based on the fast-forwarding amount; and
 generating the customized summary for consumed and unconsumed media assets in the series, wherein the level of detail of the customized summary for an unconsumed media asset is different than a consumed media asset and is correlated to the determined level of interest and inclusion of an unconsumed media asset, from the unconsumed media assets, is included in the customized summary only if a priority value associated with the unconsumed media asset exceeds a minimum threshold priority value.

2. The method of claim 1, wherein the customized summary for the series includes a different level of customization for one episode as compared to another episode of the series, wherein the different level of customization correlates to the level of interest based on the fast-forwarding amount of the episode.

3. The method of claim 2, wherein the one episode has a higher level of interest than the another episode in the series.

4. The method of claim 2, wherein a higher level of detail is included in the customized summary for the episode having a higher level of interest than the episode having a lower level of interest.

5. The method of claim 1, wherein a look-up table maps the fast-forwarding amount to a level of interest value.

6. The method of claim 1, wherein determining the level of interest includes associating a lower-level interest with a higher fast-forwarding amount and a higher-level interest with a lower fast-forwarding amount.

7. The method of claim 1, wherein a higher level of interest results in a more detailed customized summary than a lower level of interest.

8. The method of claim 7, wherein the more detailed customized summary is a summary of two-minutes or longer, while a lesser detailed customized summary is a summary of less than two minutes.

9. The method of claim 1, wherein the customized summary is generated if the level of interest is above a minimum threshold value.

10. The method of claim 9, wherein the minimum threshold value is determined by an adjustable configuration setting or automatically selected by the control circuitry.

11. A system for generating a customized summary for media assets in a series, the system comprising:
communications circuitry; and
control circuitry communicably coupled to the communications circuitry and configured to:
retrieve, via the communications circuitry, a fast-forwarding amount that relates to the fast-forwarding of at least a portion of the series in association with a user profile;
determine a level of interest based on the fast-forwarding amount; and
generate the customized summary for consumed and unconsumed media assets in the series, wherein the level of detail of the customized summary for an unconsumed media asset is different than a consumed media asset and is correlated to the determined level of interest, and inclusion of an unconsumed media asset, from the unconsumed media assets, is included in the customized summary only if a priority value associated with the unconsumed media asset exceeds a minimum threshold priority value.

12. The method of claim 11, wherein the customized summary for the series includes a different level of customization for one episode as compared to another episode of the series, wherein the different level of customization correlates to the level of interest based on the fast-forwarding amount of the episode.

13. The system of claim 12, wherein the one episode has a higher level of interest than the another episode in the series.

14. The system of claim 12, wherein a higher level of detail is included in the customized summary for the episode having a higher level of interest than the episode having a lower level of interest.

15. The system of claim 11, wherein a look-up table maps the fast-forwarding amount to a level of interest value.

16. The system of claim 11, wherein determining a level of interest includes associating a lower-level interest with a higher fast-forwarding amount and a higher-level interest with a lower fast-forwarding amount.

17. The system of claim 11, wherein a higher level of interest results in a more detailed customized summary than a lower level of interest.

18. The system of claim 17, wherein the more detailed customized summary is a summary of two-minutes or longer, while a lesser detailed customized summary is a summary of less than two minutes.

19. The method of claim 1, further comprising:
determining that a segment in the series has not been consumed; and
in response to the determining that the segment in the series has not been consumed:
determining a characteristic in the not consumed segment; and
updating the generated customized summary for the media assets in the series by removing a portion of the customized summary associated with the determined characteristic.

20. The method of claim 1, further comprising:
determining interest in a characteristic based on the user profile; and
removing a second unconsumed media asset, from the unconsumed media assets, if the second unconsumed media asset does not include the interested characteristic.

* * * * *